United States Patent
Yang et al.

(10) Patent No.: US 10,924,252 B2
(45) Date of Patent: Feb. 16, 2021

(54) SEQUENCE GENERATION TO SUPPORT DEMODULATION REFERENCE SIGNAL MULTIPLEXING FOR PI OVER 2 BINARY PHASE SHIFT KEYING MODULATION

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/744,548

(22) Filed: Jan. 16, 2020

(65) Prior Publication Data

US 2020/0235900 A1    Jul. 23, 2020

Related U.S. Application Data

(60) Provisional application No. 62/810,357, filed on Feb. 25, 2019, provisional application No. 62/794,953, filed on Jan. 21, 2019.

(51) Int. Cl.
*H04W 4/00* (2018.01)
*H04L 5/10* (2006.01)
(Continued)

(52) U.S. Cl.
CPC ............ *H04L 5/10* (2013.01); *H04J 13/0029* (2013.01); *H04L 5/0051* (2013.01); *H04L 27/2092* (2013.01); *H04L 27/2614* (2013.01)

(58) Field of Classification Search
None
See application file for complete search history.

(56) References Cited

U.S. PATENT DOCUMENTS

2013/0022087 A1* 1/2013 Chen ............... H04L 27/2613
375/147
2014/0177584 A1* 6/2014 Ouchi ............... H04W 52/146
370/329

(Continued)

FOREIGN PATENT DOCUMENTS

| EP | 3605988 A1 | 2/2020 |
| WO | 2018061572 A1 | 4/2018 |
| WO | 2018170842 A1 | 9/2018 |

OTHER PUBLICATIONS

International Search Report and Written Opinion—PCT/US2020/013988—ISA/EPO—dated Jul. 14, 2020.

(Continued)

*Primary Examiner* — Phirin Sam
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may receive an indication of a demodulation reference signal (DMRS) port to be used by the UE for transmitting a DMRS communication; determine a base sequence based at least in part on the DMRS port; generate a DMRS sequence for the DMRS port based at least in part on the base sequence; and transmit the DMRS communication including the DMRS sequence via the DMRS port. Numerous other aspects are provided.

30 Claims, 11 Drawing Sheets

(51) Int. Cl.
*H04L 5/00* (2006.01)
*H04L 27/26* (2006.01)
*H04J 13/00* (2011.01)
*H04L 27/20* (2006.01)

(56) References Cited

U.S. PATENT DOCUMENTS

| | | | |
|---|---|---|---|
| 2014/0348109 A1* | 11/2014 | Chen | H04B 7/0456 |
| | | | 370/329 |
| 2016/0323895 A1* | 11/2016 | Pourahmadi | H04W 72/082 |
| 2017/0265092 A1* | 9/2017 | Liu | H04J 13/10 |
| 2017/0317808 A1 | 11/2017 | You et al. | |
| 2018/0198657 A1* | 7/2018 | Aiba | H04W 72/042 |
| 2018/0262308 A1 | 9/2018 | Si et al. | |
| 2019/0089504 A1* | 3/2019 | Hwang | H04L 5/0051 |
| 2019/0090142 A1* | 3/2019 | Liu | H04L 25/0226 |
| 2019/0245640 A1 | 8/2019 | Yoshimoto et al. | |

OTHER PUBLICATIONS

Partial International Search Report—PCT/US2020/013988—ISA/EPO—dated Apr. 14, 2020.

* cited by examiner

SEQUENCE GENERATION TO SUPPORT DEMODULATION REFERENCE SIGNAL MULTIPLEXING FOR PI OVER 2 BINARY PHASE SHIFT KEYING MODULATION

CROSS-REFERENCE TO RELATED APPLICATIONS

This application claims priority to U.S. Provisional Patent Application No. 62/794,953, filed on Jan. 21, 2019, entitled "SEQUENCE GENERATION TO SUPPORT DEMODULATION REFERENCE SIGNAL MULTIPLEXING FOR PI OVER 2 BINARY PHASE SHIFT KEYING MODULATION," which is hereby expressly incorporated by reference herein. This application also claims priority to U.S. Provisional Patent Application No. 62/810,357, filed on Feb. 25, 2019, entitled "SEQUENCE GENERATION TO SUPPORT DEMODULATION REFERENCE SIGNAL MULTIPLEXING FOR PI OVER 2 BINARY PHASE SHIFT KEYING MODULATION," which is hereby expressly incorporated by reference herein.

FIELD OF THE DISCLOSURE

Aspects of the present disclosure generally relate to wireless communication and to techniques and apparatuses for sequence generation to support demodulation reference signal (DMRS) multiplexing for pi over 2 ($\pi/2$ or $\pi/2$) binary phase shift keying (BPSK) modulation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving an indication of a demodulation reference signal (DMRS) port to be used by the UE for transmitting a DMRS communication; determining a base sequence based at least in part on the DMRS port; generating a DMRS sequence for the DMRS port based at least in part on the base sequence; and transmitting the DMRS communication including the DMRS sequence via the DMRS port.

In some aspects, a UE for wireless communication may include memory and one or more processors operatively coupled to the memory. The memory and the one or more processors may be configured to receive an indication of a DMRS port to be used by the UE for transmitting a DMRS communication; determine a base sequence based at least in part on the DMRS port; generate a DMRS sequence for the DMRS port based at least in part on the base sequence; and transmit the DMRS communication including the DMRS sequence via the DMRS port.

In some aspects, a non-transitory computer-readable medium may store one or more instructions for wireless communication. The one or more instructions, when executed by one or more processors of a UE, may cause the one or more processors to receive an indication of a DMRS port to be used by the UE for transmitting a DMRS communication; determine a base sequence based at least in part on the DMRS port; generate a DMRS sequence for the DMRS port based at least in part on the base sequence; and transmit the DMRS communication including the DMRS sequence via the DMRS port.

In some aspects, an apparatus for wireless communication may include means for receiving an indication of a DMRS port to be used by the apparatus for transmitting a DMRS communication; means for determining a base sequence based at least in part on the DMRS port; means for generating a DMRS sequence for the DMRS port based at least in part on the base sequence; and means for transmitting the DMRS communication including the DMRS sequence via the DMRS port.

In some aspects, a method of wireless communication, performed by a base station, may include transmitting an indication of a DMRS port to be used by a UE for transmission of one or more DMRS communications; receiving a DMRS communication transmitted by the UE using the DMRS port; determining a DMRS base sequence used for the DMRS communication based at least in part on the DMRS port; and determining channel characteristics associated with the DMRS port based at least in part on the DMRS base sequence and the DMRS communication.

In some aspects, a base station for wireless communication may include memory and one or more processors operatively coupled to the memory. The memory and the one or more processors may be configured to transmit an indication of a DMRS port to be used by a UE for transmission of one or more DMRS communications; receive a DMRS communication transmitted by the UE using the DMRS port; determine a DMRS base sequence used for the DMRS communication based at least in part on the DMRS port; and determine channel characteristics associated with the DMRS port based at least in part on the DMRS base sequence and the DMRS communication.

In some aspects, a non-transitory computer-readable medium may store one or more instructions for wireless communication. The one or more instructions, when executed by one or more processors of a base station, may cause the one or more processors to transmit an indication of a DMRS port to be used by a UE for transmission of one or more DMRS communications; receive a DMRS communication transmitted by the UE using the DMRS port; determine a DMRS base sequence used for the DMRS communication based at least in part on the DMRS port; and determine channel characteristics associated with the DMRS port based at least in part on the DMRS base sequence and the DMRS communication.

In some aspects, an apparatus for wireless communication may include means for transmitting an indication of a DMRS port to be used by a UE for transmission of one or more DMRS communications; means for receiving a DMRS communication transmitted by the UE using the DMRS port; means for determining a DMRS base sequence used for the DMRS communication based at least in part on the DMRS port; and means for determining channel characteristics associated with the DMRS port based at least in part on the DMRS base sequence and the DMRS communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
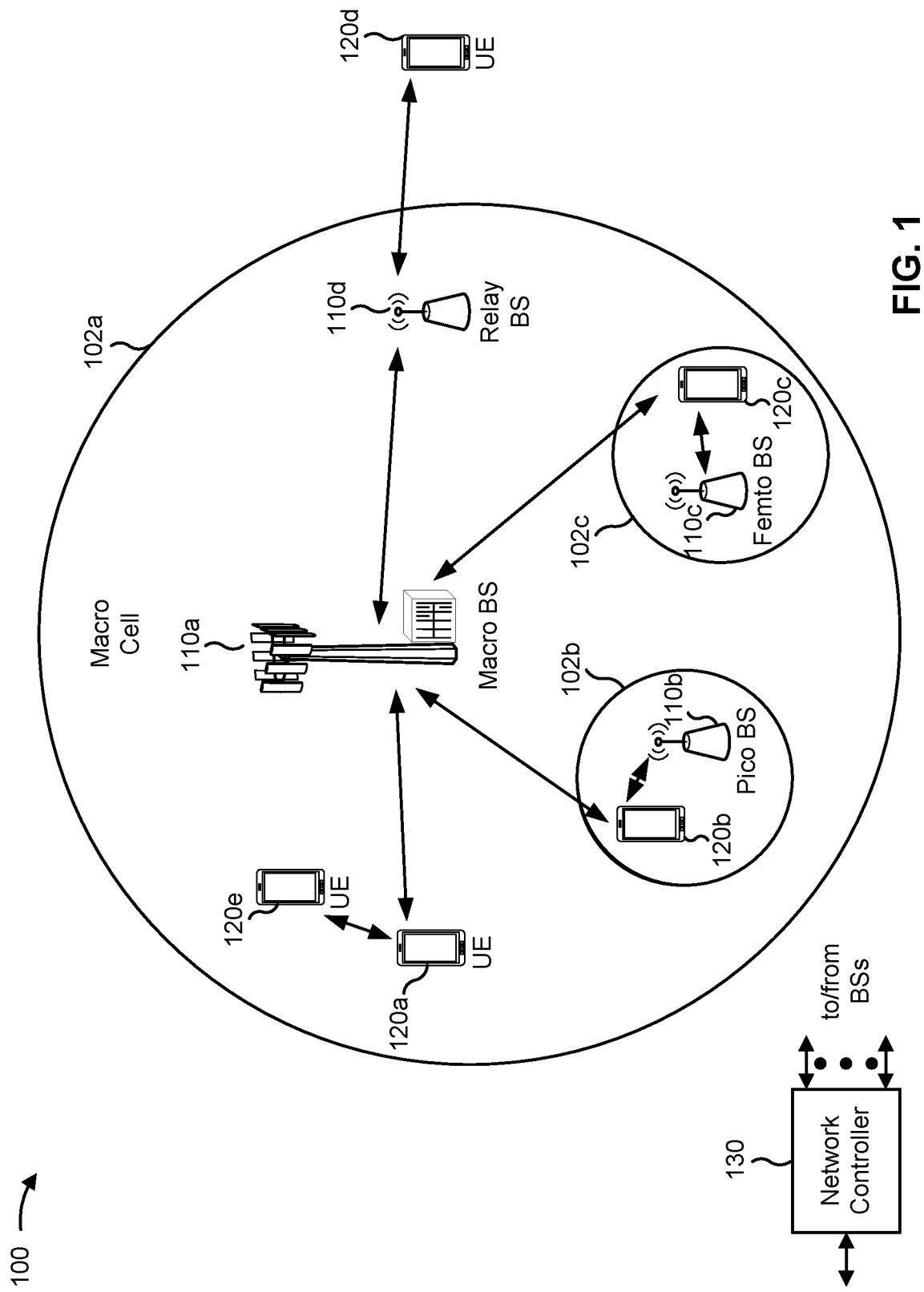
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
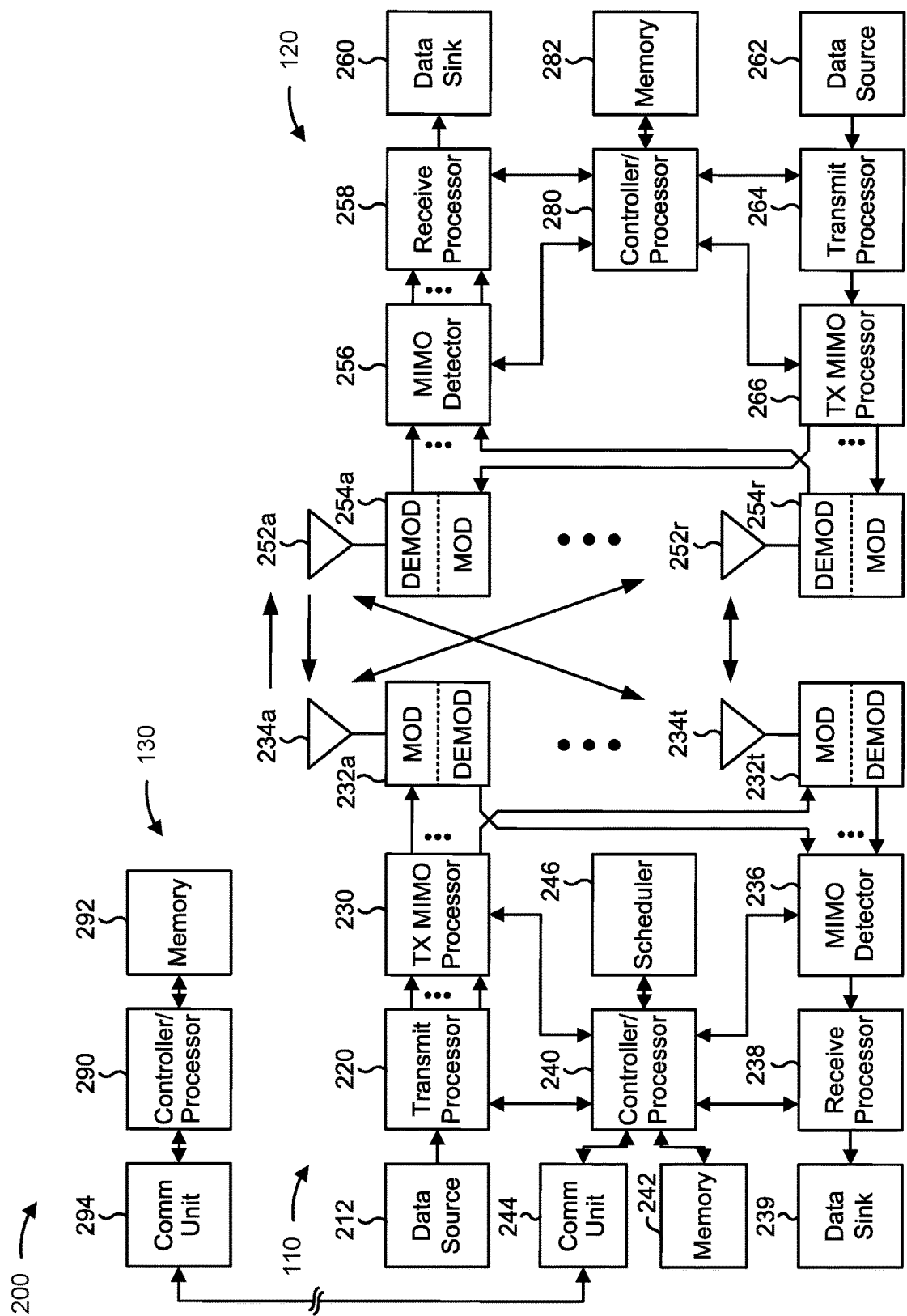
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sequence generation to support DMRS multiplexing for pi over 2 BPSK modulation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of a DMRS port to be used by the UE 120 for transmitting a DMRS communication; means for determining a base sequence based at least in part on the DMRS port; means for generating a DMRS sequence for the DMRS port based at least in part on the base sequence; means for transmitting the DMRS communication including the DMRS sequence via the DMRS port; and/or the like. In some aspects, such means may include one or more components of UE 120 described in connection with FIG. 2.

In some aspects, base station 110 may include means for transmitting an indication of a DMRS port to be used by a UE for transmission of one or more DMRS communications; means for receiving a DMRS communication transmitted by the UE using the DMRS port; means for determining a DMRS base sequence used for the DMRS communication based at least in part on the DMRS port; means for determining channel characteristics associated with the DMRS port based at least in part on the DMRS base sequence and the DMRS communication; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
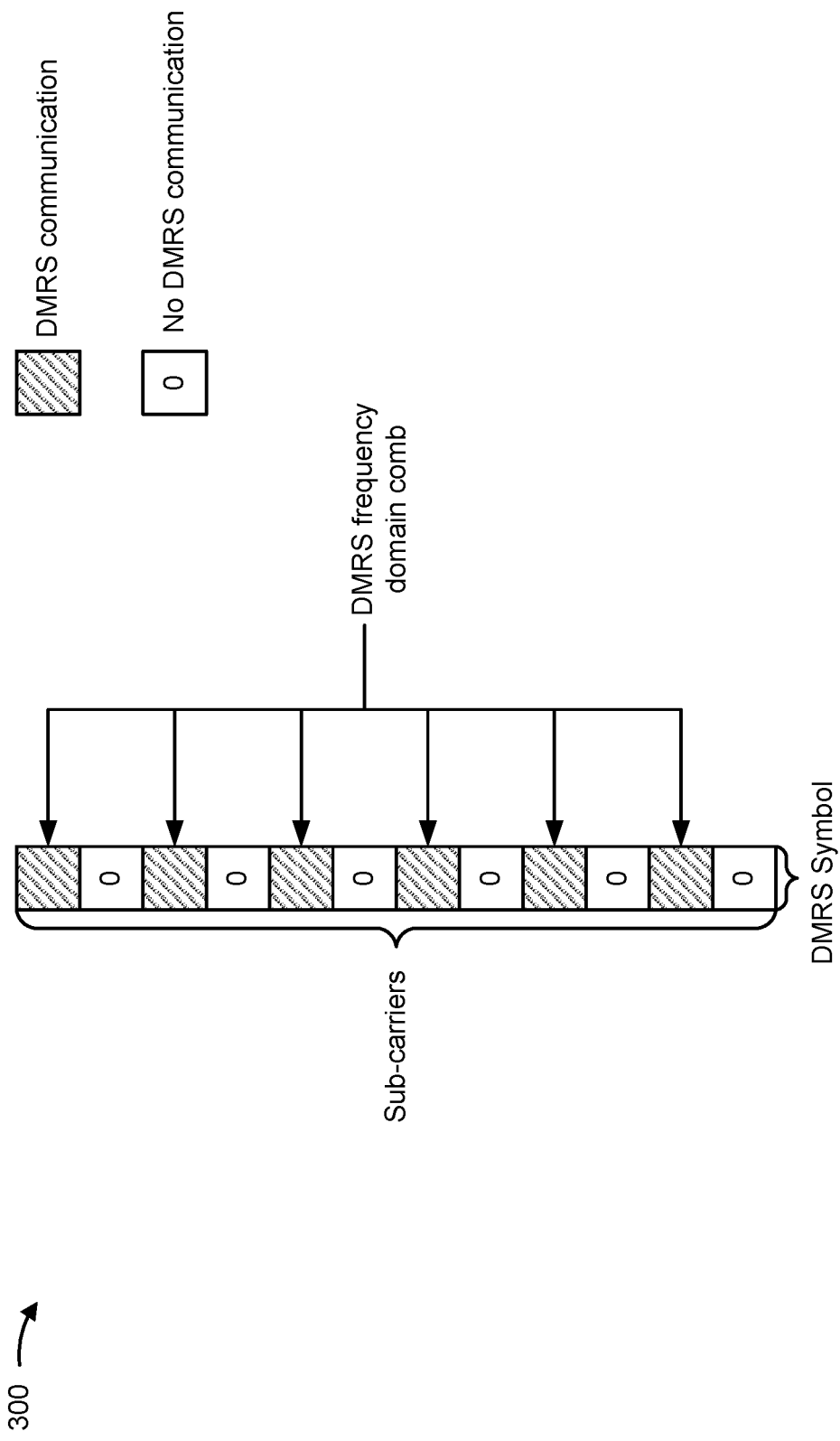
FIG. 3 is a diagram of an example of a DMRS frequency domain comb, in accordance with various aspects of the present disclosure.

FIG. 3 is a diagram of an example 300 of a DMRS frequency domain comb, in accordance with various aspects of the present disclosure.

Some radio access technologies, such as New Radio, support pi over 2 (pi/2, or π/2) binary phase shift keying (BPSK) modulation with discrete Fourier transform (DFT)-spread-orthogonal frequency-division multiplexing (OFDM) (DFT-s-OFDM) for uplink communications. This modulation scheme provides a lower peak-to-average power ratio (PAPR) for a UE 120 relative to other modulation schemes, such as quadrature phase shift keying (QPSK), quadrature amplitude modulation (QAM), and/or the like. As a result, using pi/2 BPSK modulation may result in improved performance for the UE 120, particularly when the UE 120 is located at or near a cell edge, by permitting the UE 120 to transmit an uplink communication with a higher transmit power without violating a maximum power constraint.

In some cases, pi/2 BPSK modulation may be used with a DMRS sequence that uses a Zadoff-Chu (ZC) sequence (e.g., with frequency domain spectral shaping (FDSS)) as a base sequence. This results in a DMRS sequence that has a higher PAPR than an uplink data communication that uses pi/2 BPSK modulation. This may cause link budget loss with regard to a communication link between the UE 120 and a base station 110, and/or may cause a transmit power of the UE 120 to be limited by a DMRS communication rather than a data communication, thereby offsetting the performance issues gained by using pi/2 BPSK modulation.

As shown in FIG. 3, in some cases a frequency domain comb structure (sometimes referred to as a frequency comb, a frequency domain comb, or similar terminology) may be used for DMRS transmissions (e.g., for transmissions on a physical uplink shared channel (PUSCH)). Using a frequency domain comb, a UE 120 may transmit DMRS communications on a subset of sub-carriers of a bandwidth, such as by transmitting only on sub-carriers identified using an even index value or only on sub-carriers identified using an odd index value (e.g., even frequency tones or odd frequency tones). To generate orthogonal DMRS sequences for simultaneous transmission on different DMRS ports (e.g., by different UEs 120) in the same set of resources (e.g., the same symbol, the same set of sub-carriers, and/or the like), a time-domain cyclic shift may be applied for DMRS sequences generated using a Zadoff-Chu base sequence. However, this technique cannot be applied to a DMRS sequence transmitted in an uplink transmission that is modulated using pi/2 BPSK modulation because such a DMRS sequence is modulated differently in the frequency domain compared to the ZC-based DMRS sequence (e.g., the ZC-based DMRS sequence has a flat amplitude in the frequency domain whereas the pi/2 BPSK-based DMRS base sequence is a time-domain constant-modulus sequence with a variable amplitude in the frequency domain). Based on this, using a time-domain cyclic shift for a pi/2 BPSK-based DMRS base sequence will not generate orthogonal DMRS sequences.

Some techniques and apparatuses described herein allow UEs 120 to generate orthogonal or quasi-orthogonal DMRS sequences for uplink transmissions that are modulated using pi/2 BPSK modulation. For example, a UE 120 may determine a base sequence for a DMRS sequence based at least in part on a DMRS port assigned to the UE 120 for use by the UE 120 to transmit a DMRS communication. In this way, different DMRS ports (e.g., used by different UEs 120 to transmit DMRS communications) may be associated with different base sequences (e.g., the base sequences may be DMRS port-specific). In this way, some techniques and apparatuses described herein facilitate use of orthogonal or quasi-orthogonal DMRS ports with pi/2 BPSK modulation. This may permit a UE 120 to transmit uplink communications using pi/2 BPSK modulation with low PAPR for both a data communication and a corresponding DMRS communication. In this way, performance may be improved for the UE 120, particularly when the UE 120 is located at or near a cell edge, by permitting the UE 120 to transmit an uplink communication with a higher transmit power without violating a maximum power constraint. Furthermore, multiple UEs 120 may be permitted to communicate with a base station 110 using the same uplink resource(s), and the base station 110 may distinguish the UEs 120 using corresponding DMRS communications of the UEs 120.

In some cases, a time-domain orthogonal cover code (OCC) may be used to generate orthogonal DMRS sequences for a pi/2 BPSK-based DMRS base sequence. However, applying a time-domain OCC to generate orthogonal DMRS sequences may only work for some base sequences, and not all base sequences. For example, when a time-domain OCC is applied to some base sequences, the resulting DMRS sequences may not be orthogonal to the base sequence after passing through a multipath fading channel. Some techniques and apparatuses described herein may permit different schemes for generating orthogonal or quasi-orthogonal DMRS sequences to be applied to different base sequences (e.g., a time-domain OCC scheme may be applied to a first base sequence, a cyclic shift may be applied to a second base sequence, and/or the like). This may improve channel estimation performance when a large number of UEs 120 communicate simultaneously to the base station 110, thereby improving spectral efficiency.

Furthermore, some techniques and apparatuses described herein may be used by UEs 120 in the same cell to generate orthogonal or quasi-orthogonal DMRS sequences using different base sequences (e.g., based at least in part on corresponding DMRS ports assigned to the UEs 120 for use by the UEs 120 for transmitting DMRS communications). In some cases, using different DMRS base sequences for different UEs 120 in the same cell may result in poor performance due to cross-correlation and/or interference issues. However, some techniques and apparatuses described herein overcome these issues due to the manner in which DMRS base sequences are selected and/or generated. Additional details are described below.

As indicated above, FIG. 3 is provided as an example. Other examples may differ from what is described with regard to FIG. 3.

Figure 4:
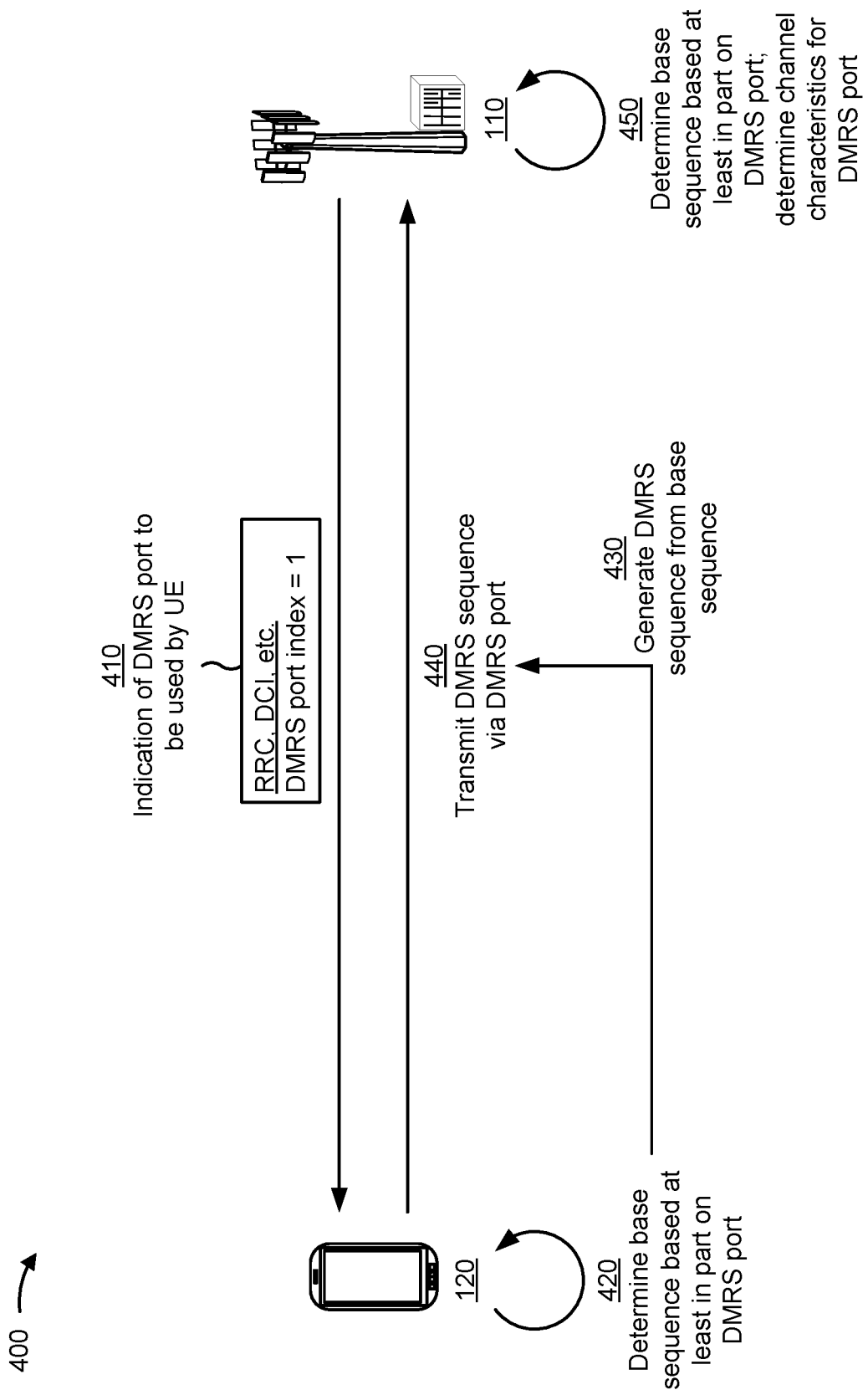
FIGS. 4-7 are diagrams illustrating examples of sequence generation to support DMRS multiplexing for pi over 2 BPSK modulation, in accordance with various aspects of the present disclosure.

FIG. 4 is a diagram illustrating an example 400 of sequence generation to support DMRS multiplexing for pi over 2 BPSK modulation, in accordance with various aspects of the present disclosure.

As shown by reference number 410, a base station 110 may transmit, and a UE 120 may receive, an indication of a DMRS port to be used by the UE 120 for transmitting a DMRS communication. For example, the DMRS port may be indicated in a signaling message, such as a radio resource control (RRC) message (e.g., an RRC configuration message, an RRC reconfiguration message, and/or the like), downlink control information (DCI), a media access control (MAC) control element (MAC-CE), and/or the like. In some aspects, the DMRS port may be indicated using a DMRS port index. For example, a first DMRS port may be identified using a first DMRS port index value, a second DMRS port may be identified using a second DMRS port index value, and/or the like. In some aspects, different DMRS port index values may be assigned to different UEs 120 to permit simultaneous communications by those UEs 120 (e.g., in the same set of time resources or symbols, the same set of frequency resources or sub-carriers, and/or the like).

As shown by reference number 420, the UE 120 may determine a base sequence (sometimes referred to herein as a DMRS base sequence) based at least in part on the DMRS port assigned to the UE 120 for use by the UE 120 to transmit the DMRS communication. As described below, the UE 120 may use the base sequence to generate a DMRS sequence to be transmitted in an uplink communication of the UE 120. In some aspects, the base sequence may be a Gold sequence, as described below in more detail in connection with FIG. 5. In some aspects, the base sequence may be a computer-generated sequence, as described in more detail below in connection with FIGS. 6 and 7.

As shown by reference number 430, the UE 120 may generate a DMRS sequence based at least in part on the base sequence. For example, the UE 120 may apply one or more DMRS sequence generation techniques to generate the DMRS sequence from the base sequence (e.g., by applying a cyclic shift to the base sequence, by applying an orthogonal cover code to the base sequence, and/or the like).

As shown by reference number 440, the UE 120 may transmit, and the base station 110 may receive, the DMRS sequence via the DMRS port (e.g., an antenna port assigned to the UE 120 and used for DMRS). For example, the UE 120 may transmit the DMRS sequence, via the DMRS port, in an uplink transmission. The uplink transmission may include the DMRS sequence and an uplink data transmission (e.g., on an uplink data channel, such as a physical uplink shared channel (PUSCH)), or the uplink transmission may include the DMRS sequence and an uplink control transmission (e.g., on an uplink control channel, such as a physical uplink control channel (PUCCH)). The UE 120 may modulate the uplink transmission using pi over two (pi/2) BPSK modulation. For example, the UE 120 may modulate the DMRS sequence and the uplink data transmission using pi/2 BPSK modulation, or the UE 120 may modulate the DMRS sequence and the uplink control transmission using pi/2 BPSK modulation.

As shown by reference number 450, the base station 110 may receive the DMRS communication (e.g., the uplink transmission that includes the DMRS sequence) and may determine a base sequence used for the DMRS communication. The base station 110 may determine the base sequence based at least in part on the DMRS port used by the UE 120 for transmitting the DMRS communication. For example, the base station 110 may use a mapping rule to determine the base sequence based at least in part on the DMRS port. The mapping rule may be a same mapping rule as is used by the UE 120 to generate the base sequence based at least in part on the DMRS port.

As further shown, the base station 110 may determine channel characteristics associated with the DMRS port (e.g., the UE 120) based at least in part on the DMRS base sequence and/or the DMRS communication. The base station 110 may use the channel characteristics for communications with the UE 120. For example, the base station 110 may use the DMRS base sequence and/or the DMRS communication for channel estimation, coherent demodulation, and/or the like.

In some aspects, the UE 120 may transmit, and the base station 110 may receive, the DMRS sequence (in the uplink transmission) in a same symbol and a same set of sub-carriers (e.g., a same frequency domain comb) as another DMRS sequence transmitted by another UE 120 in a same cell as the UE 120. Alternatively, the UE 120 may transmit, and the base station 110 may receive, the DMRS sequence (in the uplink transmission) in a same symbol and a same set of resource blocks, but on a different set of sub-carriers (e.g., a different frequency domain comb), as another DMRS sequence transmitted by another UE 120 in a same cell as the UE 120. Using the techniques and apparatuses described herein, different (e.g., orthogonal or quasi-orthogonal) DMRS sequences may be transmitted by the different UEs 120 in the same time resource and/or the same set of frequency resources. Because the UEs 120 determine different base sequences depending on a DMRS port assignment, the UEs 120 may generate different DMRS sequences. As a result, the base station 110 may be able to distinguish the DMRS sequences for the different DMRS ports used by the different UEs 120 to transmit DMRS communications.

As indicated above, FIG. 4 is provided as an example. Other examples may differ from what is described with respect to FIG. 4.

Figure 5:
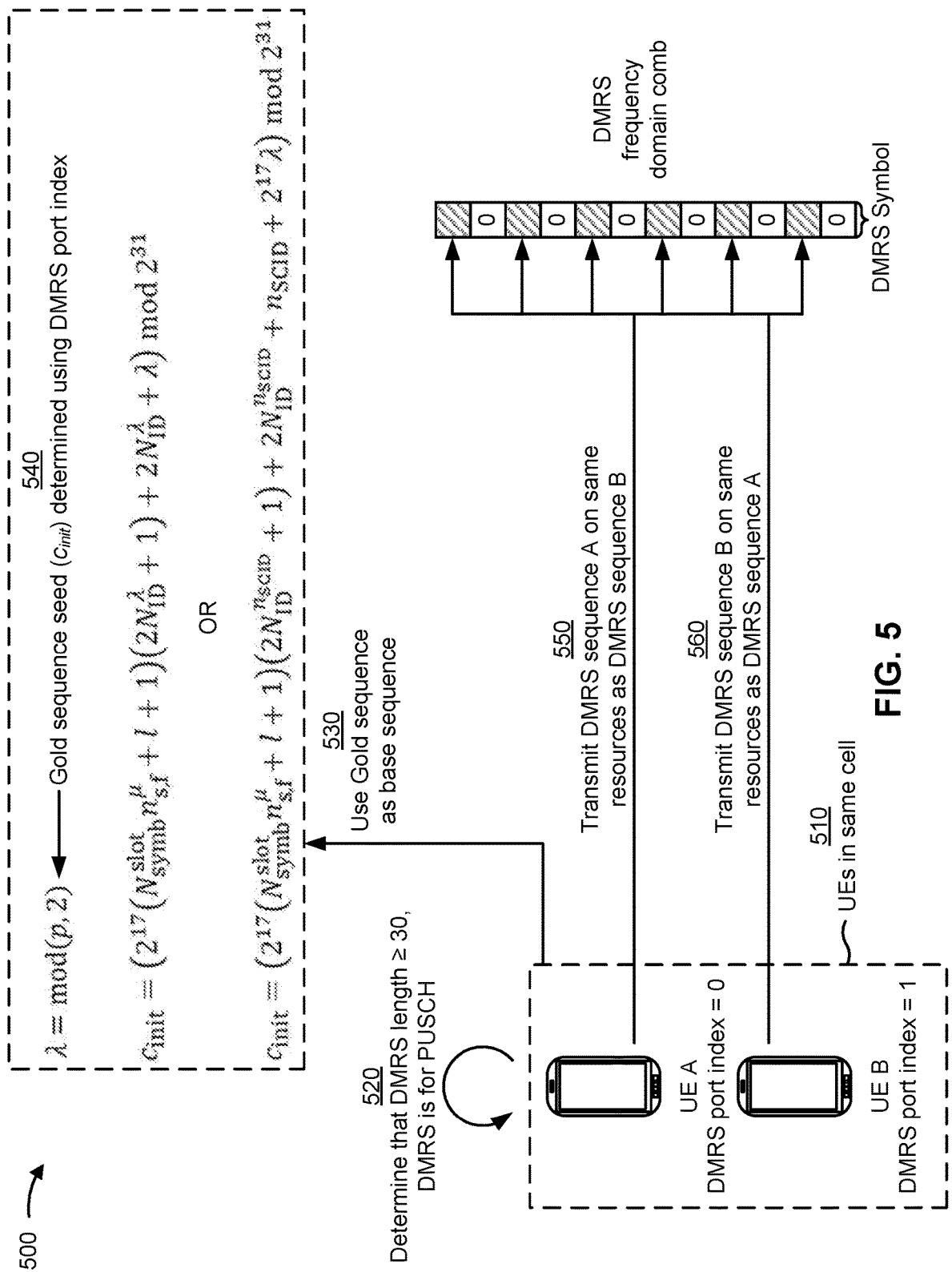

FIG. 5 is a diagram illustrating an example 500 of sequence generation to support DMRS multiplexing for pi over 2 BPSK modulation, in accordance with various aspects of the present disclosure.

As shown by reference number 510, two UEs 120 located in the same cell may be assigned different DMRS ports. For example, a first UE 120, shown as UE A, may be assigned a first DMRS port having a DMRS port index of 0, and a second UE 120, shown as UE B, may be assigned a second DMRS port having a DMRS port index of 1. A UE 120 may generate a DMRS sequence using a base sequence that depends on the DMRS port index assigned to the UE 120. Thus, the UE 120 may determine the base sequence based at least in part on the DMRS port index. Additionally, or alternatively, the UE 120 may determine the base sequence based at least in part on whether the DMRS sequence is to be transmitted on an uplink data channel (e.g., the PUSCH) or an uplink control channel (e.g., the PUCCH). Additionally, or alternatively, the UE 120 may determine the base sequence based at least in part on a length of the DMRS (e.g., a number of sub-carriers and/or resource blocks in which the DMRS is to be transmitted), which may depend on a resource allocation assigned to the UE 120.

As shown by reference number 520, in example 500, the UEs 120 may determine that the DMRS sequence is to be transmitted via the PUSCH, and the UEs 120 may determine that the DMRS length satisfies a threshold (e.g., is greater than or equal to 30). For a DMRS with a longer length, a Gold sequence may have better performance (e.g., than a computer-generated sequence, described below). Thus, as shown by reference number 530, the UEs 120 may determine to use a Gold sequence (e.g., a pi/2 BPSK modulated Gold sequence) as the base sequence for DMRS generation based at least in part on the determination that the DMRS length is greater than or equal to a threshold (e.g., 30) and/or the determination that the DMRS sequence is to be transmitted on the PUSCH.

As shown by reference number 540, a UE 120 may generate the Gold sequence (e.g., as the base sequence) using a seed that depends on a DMRS port (e.g., a DMRS port index) assigned to the UE 120. For example, the first UE 120 may use a DMRS port index of 0 to calculate a first seed for a first Gold sequence to be used as the base sequence for a first DMRS sequence to be transmitted by the first UE 120. Similarly, the second UE 120 may use a DMRS port index of 1 to calculate a second seed for a second Gold sequence to be used as the base sequence for a second DMRS sequence to be transmitted by the second UE 120. By using different DMRS port indexes to generate different seeds, the UEs 120 may generate different base sequences (e.g., Gold base sequences) for DMRS sequence generation.

As further shown, the seed, shown as $c_{init}$, may be generated based at least in part on performing a modulo two operation on a DMRS port index assigned to a UE 120. For example, the UE 120 may calculate a seed parameter lambda ($\lambda$) by performing a modulo two operation on a DMRS port index p assigned to the UE 120 (e.g., shown as $\lambda = \mathrm{mod}(p,2)$). Thus, the seed parameter may be a binary value that has a first value (e.g., zero) for a first set of DMRS port indexes (e.g., that have an even value) and that has a second value (e.g., one) for a second set of DMRS port indexes (e.g., that have an odd value). In some cases, a pair of DMRS port indexes that include an even value and an odd value (e.g., a pair of {0,1}, a pair of {2,3}, a pair of {4,5}, a pair of {6,7}, and/or the like) may be scheduled to transmit DMRS on the same frequency domain comb (e.g., in the same symbol and the same set of sub-carriers). Thus, by using a seed parameter with a value that varies depending on whether the DMRS port index has an even value or an odd value, a first Gold base sequence may be generated for a first DMRS sequence to be transmitted in a frequency domain comb, and a second, orthogonal (or quasi-orthogonal) Gold base sequence may be generated for a second DMRS sequence to be transmitted in the same frequency domain comb. In this way, the first UE 120 and the second UE 120 may transmit orthogonal or quasi-orthogonal DMRS sequences in the same frequency domain comb (e.g., via a first DMRS port and a second DMRS port, respectively).

In some aspects, the seed parameter lambda may replace a DMRS scrambling identifier (e.g., $n_{SCID}$) in a function or equation used to generate the seed (e.g., $c_{init}$). For example, rather than calculating the seed as follows:

$$c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31}, \quad (1)$$

the UE 120 may calculate the seed as follows:

$$c_{init}=(2^{17}(N_{symb}^{slot}n_{s,f}^{\mu}+l+1)(2N_{ID}^{\lambda}+1)+2N_{ID}^{\lambda}+\lambda) \bmod 2^{31}. \quad (2)$$

In the first equation (1) above, $n_{SCID}$ is received in a DMRS scrambling field in the scheduling DCI. In the second equation (2) above, lambda is substituted for $n_{SCID}$, and lambda is calculated as mod(p,2). In the second equation (2) above, the notation for lambda could be changed back to the term $n_{SCID}$ (e.g., for notational convenience) to reuse the notation from the first equation (1), as follows:

$$c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31}. \quad (3)$$

However, the meaning of $n_{SCID}$ in the third equation (3) is now different from the first equation (1), where now $n_{SCID}$ is calculated as mod(p,2) in the third equation (3). In other words, in the third equation (3), the parameter $n_{SCID}$ represents a modulo two operation on a DMRS port index p assigned to the UE 120 (e.g., $n_{SCID}$=mod(p,2)).

In some aspects, the seed $c_{init}$ may be an integer value between 0 and $2^{31}$. In the above equations, $N_{symb}^{slot}$ may represent the number of symbols per slot, $n_{s,f}^{\mu}$ may represent the slot number within a frame for a sub-carrier spacing configuration (referenced using the symbol mu (μ)), l may represent an OFDM symbol index relative to a reference index (e.g., l may represent an OFDM symbol number within a slot), $N_{ID}^{nSCID}$ may represent a scrambling identifier for the UE 120 (e.g., which may depend on a higher layer parameter scramblingID0 and/or scramblingID1 assigned to the UE 120 and/or may equal to be a UE identifier $N_{ID}^{cell}$ depending on certain conditions). Rather than $n_{SCID}$ representing a binary value (0 or 1) indicated by a DMRS initialization field in DCI associated with a PUSCH transmission, $n_{SCID}$ may represent a binary value determined by performing a modulo two operation on a DMRS port index p assigned to the UE 120 (e.g., $n_{SCID}$=mod(p,2)), as indicated by the binary value lambda (λ) in the second equation (2) above and the binary value $n_{SCID}$ in the third equation (3) above.

Additionally, or alternatively, the seed parameter lambda may be included in the calculation of the seed in a different manner, such as:

$$c_{init}=(2^{17}(N_{symb}^{slot}n_{s,f}^{\mu}+l+1)(2N_{ID}^{nSCID}+1)+2N_{ID}^{nSCID}+n_{SCID}+2^{17}\lambda) \bmod 2^{31}$$

In the above equation, lambda is multiplied by $2^{17}$ because $N_{ID}^{nSCID}$ includes 16 bits. Thus, the value of lambda impacts a value of the $17^{th}$ bit so as not to alter the value of the UE scrambling identifier $N_{ID}^{nSCID}$. Although some examples are described herein as using a modulo two operation to determine the seed parameter lambda (e.g., λ=mod(p,2)), in some aspects, a different modulo operation may be performed, such as a modulo four operation (e.g., λ=mod(p,4)), a modulo eight operation (e.g., λ=mod(p,8)), and/or the like. In these cases, a set of four DMRS ports (e.g., {0, 1, 2, 3} or {4, 5, 6, 7}) may each use different seeds (and different Gold base sequences), a set of eight DMRS ports (e.g., {0, 1, 2, 3, 4, 5, 6, 7}) may each use different seeds (and different Gold base sequences), and/or the like.

In some aspects, the UE 120 may input the value of the seed into a Gold sequence generator of the UE 120 that generates a bit stream based at least in part on the value of the seed (e.g., a first bit c0 through an $N^{th}$ bit $c_N$, where N is the length of the bit stream). The bit stream may be a Gold sequence that is used as a base sequence for DMRS sequence generation. The UE 120 may apply one or more sequence generation techniques (e.g., a cyclic shift, an OCC, and/or the like) to the Gold base sequence to generate a DMRS sequence for transmission. Thus, the first UE 120 and the second UE 120 may generate different DMRS sequences from different Gold base sequences that are generated based at least in part on a respective DMRS port index assigned to the first UE 120 and the second UE 120.

As shown by reference number 550, the first UE 120 (e.g., UE A) may generate a first DMRS sequence (e.g., DMRS sequence A), and may transmit the first DMRS sequence on a DMRS frequency domain comb. Similarly, as shown by reference number 560, the second UE 120 (e.g., UE B) may generate a second DMRS sequence (e.g., DMRS sequence B), and may transmit the second DMRS sequence on the same DMRS frequency domain comb. For example, the first DMRS sequence and the second DMRS sequence may be transmitted in the same symbol and the same set of sub-carriers, as shown. Alternatively, the first DMRS sequence and the second DMRS sequence may be transmitted in the same symbol and the same set of resource blocks, but may be transmitted on a different set of sub-carriers (e.g., may be transmitted on different DMRS frequency combs). A base station 110 may be capable of distinguishing the first DMRS sequence and the second DMRS sequence (e.g., for different DMRS ports used by the first UE 120 and the second UE 120) despite those DMRS sequences being transmitted in the same time and/or frequency resources.

As indicated above, FIG. 5 is provided as an example. Other examples may differ from what is described with respect to FIG. 5.

Figure 6:
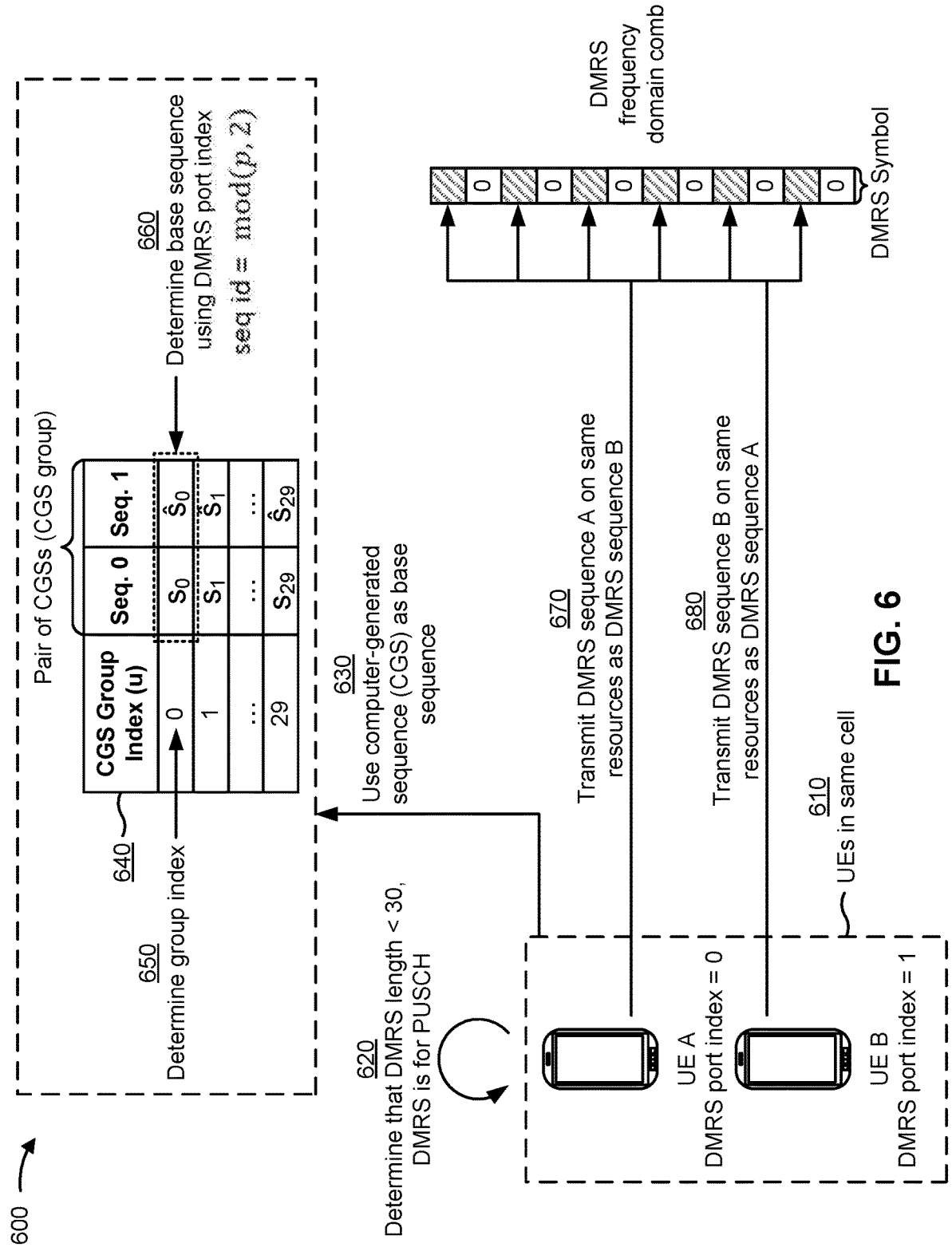

FIG. 6 is a diagram illustrating an example 600 of sequence generation to support DMRS multiplexing for pi over 2 BPSK modulation, in accordance with various aspects of the present disclosure.

As shown by reference number 610, two UEs 120 located in the same cell may be assigned different DMRS ports, as described above in connection with FIG. 5. A UE 120 may determine a base sequence to be used for DMRS sequence generation based at least in part on a DMRS port index assigned to the UE 120, based at least in part on whether the DMRS sequence is to be transmitted on an uplink data channel or an uplink control channel based at least in part on a length of the DMRS, and/or the like.

As shown by reference number 620, in example 600, the UEs 120 may determine that the DMRS sequence is to be transmitted via the PUSCH, and the UEs 120 may determine that the DMRS length does not satisfy a threshold (e.g., is less than 30). For a DMRS with a shorter length, a computer-generated sequence may have better performance (e.g., than a Gold sequence, described above). Thus, as shown by reference number 630, the UEs 120 may determine to use a computer-generated sequence (CGS) as the base sequence for DMRS generation based at least in part on the determination that the DMRS length is less than a threshold (e.g., 30) and/or the determination that the DMRS sequence is to be transmitted on the PUSCH.

As shown by reference number 640, the CGS may be selected from a table that is stored by the UE 120. In some aspects, the UE 120 may identify a table from which the CGS is to be selected based at least in part on the determination that the DMRS length is less than a threshold (e.g., 30) and/or the determination that the DMRS sequence is to be transmitted on the PUSCH. Additionally, or alternatively, the UE 120 may identify a table from which the CGS is to be selected based at least in part on the DMRS length. For example, the UE 120 may store different tables to be used for different DMRS lengths (e.g., a first table for DMRS length 6, a second table for DMRS length 12, a third table for DMRS length 18, a fourth table for DMRS length 24, and/or the like), and the UE 120 may select a table that corresponds to a DMRS length for a DMRS sequence to be transmitted by the UE 120.

As shown, the table may indicate relationships between CGS group indexes and corresponding CGS groups. For example, each CGS group index may correspond to a CGS group. In some aspects, the table may store 30 CGS indexes (shown as 0 through 29) corresponding to 30 CGS groups. In the case where the DMRS is for the PUSCH (and the DMRS length is less than a threshold), a CGS group may include a pair of CGSs (e.g., each CGS group may include exactly two CGSs). For example, a first CGS group, represented by a CGS group index of 0, may include a first pair of CGSs (e.g., shown as $s_0$ and $\hat{s}_0$), a second CGS group, represented by a CGS group index of 1, may include a second pair of CGSs (e.g., shown as $s_1$ and $\hat{s}_1$), and so on (e.g., through a thirtieth CGS group, represented by a CGS group index of 29). In some aspects, a UE 120 may select a CGS, to be used as a base sequence, based at least in part on a group index determined by the UE 120 and a DMRS port index assigned to the UE 120, as described below. In some aspects, the DMRS port index may be signaled to the UE 120 in a signaling message, such as an RRC message, a DCI message, and/or the like.

As shown by reference number 650, a UE 120 may determine a group index (e.g., a CGS group index) using a pseudo-randomly determined value (e.g., between 0 and 29). For example, the UE 120 may determine a CGS group index u using the following equations:

$$u = (f_{gh} + n_{ID}^{RS}) \bmod 30$$

$$f_{gh} = \left(\sum_{m=0}^{7} 2^m c(8(N_{symb}^{slot} n_{s,f}^{\mu} + l) + m)\right) \bmod 30$$

In the above equations, $n_{ID}^{RS}$ may represent an identifier configured for the UE 120 by the base station 110 (e.g., which may be equal to either $n_{ID}^{PUSCH}$ or $n_{ID}^{cell}$ depending on whether a higher layer parameter nPUSCH-Identity is configured for the UE 120), c may represent a random sequence used to generate a random number $f_{gh}$ between 0 and 29, and the other variables may represent values as described above in connection with FIG. 5.

As shown by reference number 660, after determining a group index that identifies a pair of CGSs included in a CGS group identified by the group index, the UE 120 may select a CGS, from the pair of CGSs, based at least in part on a DMRS port assigned to the UE 120 (e.g., a DMRS port index assigned to the UE 120). For example, the UE 120 may perform a modulo two operation on a DMRS port index p assigned to the UE 120 to calculate a sequence identifier (e.g., shown as seq id=mod(p,2)). The UE 120 may use a value of the calculated sequence identifier (seq id) to select one of the CGSs included in the pair of CGSs. For example, if the sequence identifier has a first value (e.g., 0), then the UE 120 may select a first CGS (e.g., $s_u$) included in the pair of CGSs. Similarly, if the sequence identifier has a second value (e.g., 1), then the UE 120 may select a second CGS (e.g., $\hat{s}_u$) included in the pair of CGSs.

Thus, the sequence identifier may be a binary value that has a first value (e.g., zero) for a first set of DMRS port indexes (e.g., that have an even value) and that has a second value (e.g., one) for a second set of DMRS port indexes (e.g., that have an odd value). As described above, in some cases, a pair of DMRS port indexes that include an even value and an odd value (e.g., a pair {0,1}, a pair {2,3}, a pair {4,5}, a pair {6,7}, and/or the like) may be scheduled to transmit DMRS on the same frequency domain comb (e.g., in the same symbol and the same set of sub-carriers). Thus, by using a sequence identifier with a value that varies depending on whether the DMRS port index has an even value or an odd value, a first CGS base sequence may be generated for a first DMRS sequence to be transmitted in a frequency domain comb, and a second, orthogonal (or quasi-orthogonal) CGS base sequence may be generated for a second DMRS sequence to be transmitted in the same frequency domain comb. In this way, the first UE 120 and the second UE 120 may transmit orthogonal or quasi-orthogonal DMRS sequences in the same frequency domain comb (e.g., via a first DMRS port and a second DMRS port, respectively).

In some aspects, the table may be populated with CGSs such that a first CGS base sequence and a second CGS base sequence, included in the same pair of CGSs (e.g., the same CGS group), are orthogonal or quasi-orthogonal to one another. Two sequences that are orthogonal to one another may have a cross-correlation of zero, and two sequences that are quasi-orthogonal to one another may have a cross-correlation that is less than or equal to a threshold (e.g., a first cross-correlation threshold $\gamma_1$). In some aspects, a CGS group may include two CGSs that are orthogonal to one another. Additionally, or alternatively, a CGS group may include two CGSs that are quasi-orthogonal to one another. In some aspects, each CGS group included in the table includes two CGSs that are orthogonal or quasi-orthogonal with one another. In this way, different UEs 120 assigned to transmit DMRS on the same set of resources may use orthogonal or quasi-orthogonal base sequences to generate a DMRS sequence for transmission.

Additionally, or alternatively, the table may be populated with CGSs such that a cross-correlation between any two CGSs included in the table (e.g., included in any one of the CGS groups) is less than or equal to a threshold (e.g., a second cross-correlation threshold $\gamma_2$). In some aspects, the second cross-correlation threshold $\gamma_2$ may be greater than or equal to the first cross-correlation threshold $\gamma_1$. In this way, inter-cell interference may be reduced for UEs 120 that transmit different DMRS sequences in different cells.

Additionally, or alternatively, the table may be populated with CGSs such that each CGS included in the table (e.g., included in any one of the CGS groups) has a PAPR that is less than or equal to a PAPR threshold. In this way, the benefits of pi/2 BPSK modulation, which results in a low PAPR as described above, may be realized (e.g., may not be offset by using a DMRS sequence with a high PAPR).

In some aspects, the table may be populated with CGSs (e.g., CGS base sequences) such that every pair of cyclic-shifted sequences, capable of being generated from the CGS base sequences, are orthogonal or quasi-orthogonal with one another (e.g., have cross-correlations that are less than or equal to one or more of the thresholds described above). Additionally, or alternatively, the table may be populated with CGSs (e.g., CGS base sequences) such that every cyclic-shift sequence, capable of being generated from the CGS base sequences, has a PAPR that is less than or equal to the PAPR threshold described above. In this way, the base sequences and the DMRS sequences that are generated from the base sequences may be distinguishable and/or may assist with realizing the benefits of pi/2 BPSK modulation, as described above.

With reference again to reference number 640, and as noted above, the CGS may be selected from a table that is stored by the UE 120. Additionally or alternatively to the various aspects of the table described above, the table may not include a pair of sequences per "group" index. Rather, a "group" as described above may comprise a single sequence, such that the table comprises, for example, a first CGS (e.g., $s_0$), represented by CGS index (u) 0, a second CGS (e.g., $s_1$), represented by CGS index 1, and so on (e.g., through a thirtieth CGS, represented by a CGS index of 29). In some aspects, a UE 120 may select a CGS, to be used as a base sequence, based at least in part on the CGS index (instead of a CGS group index). The CGS index may be determined by the UE 120 using the DMRS port index assigned to the UE 120, as described below. Hence, similar to the example discussed further above where the DMRS port index is used to determine a CGS, in this example, the DMRS port index can be used to determine the CGS index where a single sequence is associated with each CGS index in the table. While in the example discussed further above, the CGS group index was determined without reference to DMRS port, but the DMRS port was then used to determine the sequences of the group/pair of sequences associated with the CGS group index.

For example, the sequence identifier (which depended on the DMRS port index p) described further above for use in determining which sequence of the pair of sequences in the CGS group to select may be used to determine the CGS index. Hence, for example, the UE 120 may perform a modulo two operation on a DMRS port index p assigned to the UE 120 to calculate a sequence identifier, λ, (e.g., shown as seq id (λ)=mod(p,2)). The UE 120 may use a value of the calculated sequence identifier (seq id) to determine a CGS index (u) in order to identify the sequence to be used in the table of CGSs. The CGS index, u, can be determined based on the DMRS port index through the sequence identifier, λ, in accordance with any of the following three equations:

$$u=(f_{gh}+(1+\lambda)n_{ID}^{RS}) \bmod 30$$

$$u=((1+\lambda)f_{gh}+n_{ID}^{RS}) \bmod 30$$

$$u=(f_{gh}+n_{ID}^{RS}+\lambda \cdot 2^A) \bmod 30$$

where A is an integer {0, 1, 2, . . . } and where $f_{gh}$ can be defined as any of the following three equations $$f_{gh} = \left( \sum_{m=0}^{7} 2^m c(8(N_{symb}^{slot} n_{s,f}^\mu + l) + m) \right) \bmod 30$$

$$f_{gh} = \left( \sum_{m=0}^{7} 2^m c(8(N_{symb}^{slot} n_{s,f}^\mu + l + \lambda \cdot 2^A) + m) \right) \bmod 30$$

$$f_{gh} = \left( \sum_{m=0}^{7} 2^m c(8(N_{symb}^{slot} n_{s,f}^\mu + l) + m + \lambda \cdot 2^A) \right) \bmod 30$$

In the above equations, the variables may represent values as described above in connection with FIG. 5 and elsewhere in FIG. 6.

Once DMRS sequences are generated using a CGS as described in various aspects above, as shown by reference number 670, the first UE 120 (e.g., UE A) may generate a first DMRS sequence (e.g., DMRS sequence A), and may transmit the first DMRS sequence on a DMRS frequency domain comb. Similarly, as shown by reference number 680, the second UE 120 (e.g., UE B) may generate a second DMRS sequence (e.g., DMRS sequence B), and may transmit the second DMRS sequence on the same DMRS frequency domain comb. For example, the first DMRS sequence and the second DMRS sequence may be transmitted in the same symbol and the same set of sub-carriers, as shown. Alternatively, the first DMRS sequence and the second DMRS sequence may be transmitted in the same symbol and the same set of resource blocks, but may be transmitted on a different set of sub-carriers (e.g., may be transmitted on different DMRS frequency combs). Using some of the techniques described above, the first DMRS sequence and the second DMRS sequence may be orthogonal or quasi-orthogonal to one another. Thus, a base station 110 may be capable of distinguishing the first DMRS sequence and the second DMRS sequence (e.g., for different DMRS ports used by the first UE 120 and the second UE 120) despite those DMRS sequences being transmitted in the same time and/or frequency resources. With reference to aspects described above relating to a table of CGSs where each CGS index is associated with a single sequence, it is understood that the first DMRS sequence and the second DMRS sequence may not be orthogonal and/or may not be quasi-orthogonal to each other.

As indicated above, FIG. 6 is provided as an example. Other examples may differ from what is described with respect to FIG. 6.

Figure 7:
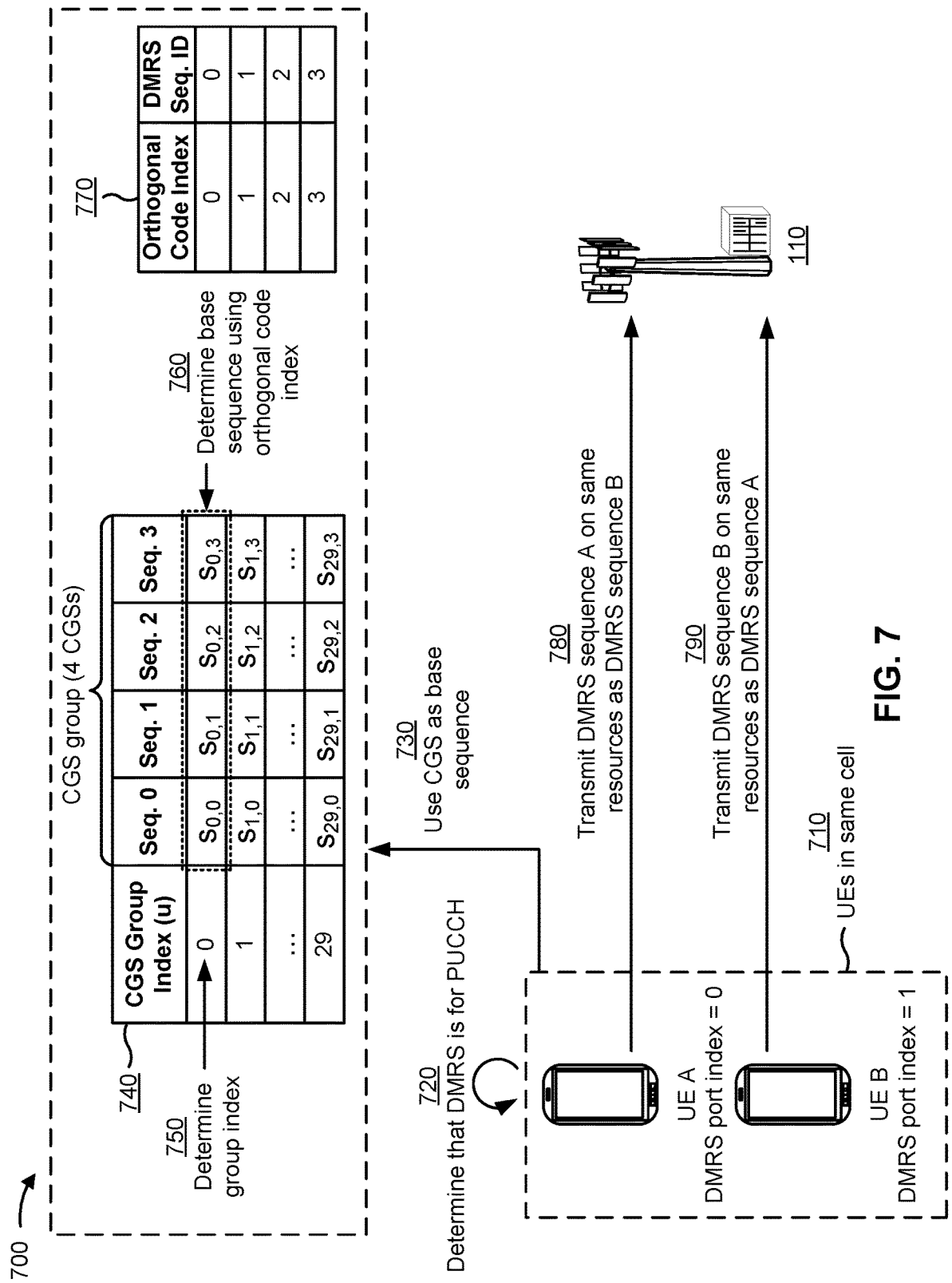

FIG. 7 is a diagram illustrating an example 700 of sequence generation to support DMRS multiplexing for pi over 2 BPSK modulation, in accordance with various aspects of the present disclosure.

As shown by reference number 710, two UEs 120 located in the same cell may be assigned different DMRS ports, as described above. A UE 120 may determine a base sequence to be used for DMRS sequence generation based at least in part on a DMRS port index assigned to the UE 120, based at least in part on whether the DMRS sequence is to be transmitted on an uplink data channel or an uplink control channel based at least in part on a length of the DMRS, and/or the like.

As shown by reference number 720, in example 700, the UEs 120 may determine that the DMRS sequence is to be transmitted via the PUCCH. In some aspects, the PUCCH (e.g., PUCCH format 4, which supports transmissions from multiple UEs 120 on the same set of frequency resources) may have a fixed DMRS length (e.g., a fixed DMRS length of 12 resource blocks). In some aspects, the PUCCH may have PUCCH format 3 (e.g., without UE multiplexing) or PUCCH format 4 (e.g., with UE multiplexing). For a DMRS with a shorter fixed length, a computer-generated sequence may have better performance (e.g., than a Gold sequence, described above). Thus, as shown by reference number 730, the UEs 120 may determine to use a CGS as the base sequence for DMRS generation based at least in part on the determination that the DMRS sequence is to be transmitted on the PUCCH (e.g., and/or a determination that the DMRS length is less than a threshold (e.g., 30)).

As shown by reference number 740, the CGS may be selected from a table that is stored by the UE 120. In some aspects, the UE 120 may identify a table from which the CGS is to be selected based at least in part on the determination that the DMRS sequence is to be transmitted on the PUCCH. For example, the UE 120 may store different tables to be used for base sequence determination for the PUSCH and for the PUCCH, and the UE 120 may select a table based at least in part on whether a DMRS sequence, to be generated using the base sequence, is to be transmitted on the PUSCH or the PUCCH. In some aspects, the same table may be used for PUCCH format 3 and PUCCH format 4.

In some aspects, different CGS tables may be used for the PUSCH and the PUCCH regardless of a length of the DMRS. For example, different tables may be used for the PUSCH and the PUCCH for different DMRS lengths, and different tables may be used for the PUSCH and the PUCCH for the same DMRS length. In particular, for DMRS length 12, a first table may be used for the PUSCH, and a second, different table may be used for the PUCCH. Because DMRS for the PUCCH has a different structure than DMRS for the PUSCH (e.g., because PUSCH DMRS has a frequency domain comb 2 structure, and because the PUCCH DMRS does not have a frequency domain comb 2 structure), performance may be improved by using separate tables of base sequences, which may be optimized or configured to improve performance depending on the DMRS structure.

As shown, the table may indicate relationships between CGS group indexes and corresponding CGS groups. For example, each CGS group index may correspond to a CGS group. In some aspects, the table may store 30 CGS indexes (shown as 0 through 29) corresponding to 30 CGS groups. In the case where the DMRS is for the PUCCH (and, as a result, the DMRS length is less than a threshold), a CGS group may include four CGSs (e.g., each CGS group may include exactly four CGSs). For example, a first CGS group, represented by a CGS group index of 0, may include a first group of four CGSs (e.g., shown as $s_{0,0}$, $s_{0,1}$, $s_{0,2}$, and $s_{0,3}$), a second CGS group, represented by a CGS group index of 1, may include a second group of four CGSs (e.g., shown as $s_{1,0}$, $s_{1,1}$, $s_{1,2}$, and $s_{1,3}$), and so on (e.g., through a thirtieth CGS group, represented by a CGS group index of 29). In some aspects, a UE 120 may select a CGS, to be used as a base sequence, based at least in part on a group index determined by the UE 120 and an orthogonal code index assigned to the UE 120, as described below. In some aspects, the orthogonal code index may be signaled to the UE 120 in a signaling message, such as an RRC message and/or the like.

As shown by reference number 750, a UE 120 may determine a group index (e.g., a CGS group index) using a pseudo-randomly determined value (e.g., between 0 and 29). For example, the UE 120 may determine a CGS group index u as described above in connection with FIG. 6 with reference to a table having pairs of sequences associated with each CGS group index. An alternative method of determining the CGS group index is described further below.

As shown by reference number 760, after determining a group index that identifies a set of CGSs included in a CGS group identified by the group index, the UE 120 may select a CGS (e.g., as a base sequence), from the set of CGSs, based at least in part on an orthogonal code index assigned to the UE 120 by the base station 110. For example, the UE 120 may determine a sequence identifier (shown as DMRS sequence ID) that corresponds to the orthogonal code index. As shown by reference number 770, in some aspects, the UE 120 may store a table that indicates relationships between orthogonal code indexes and corresponding sequence identifiers. For example, a first orthogonal code index (e.g., with a value of 0) may correspond to a first sequence identifier (e.g., with a value of 0), a second orthogonal code index (e.g., with a value of 1) may correspond to a second sequence identifier (e.g., with a value of 1), a third orthogonal code index (e.g., with a value of 2) may correspond to a third sequence identifier (e.g., with a value of 2), and a fourth orthogonal code index (e.g., with a value of 3) may correspond to a fourth sequence identifier (e.g., with a value of 3).

The UE 120 may use a value of the determined sequence identifier to select one of the CGSs included in the CGS group (e.g., a group of four CGSs). For example, the UE 120 may select a first CGS (e.g., $s_{0,0}$) included in the CGS group when the sequence identifier has a first value (e.g., 0), the UE 120 may select a second CGS (e.g., $s_{0,1}$) included in the CGS group when the sequence identifier has a second value (e.g., 1), the UE 120 may select a third CGS (e.g., $s_{0,2}$) included in the CGS group when the sequence identifier has a third value (e.g., 2), and the UE 120 may select a fourth CGS (e.g., $s_{0,3}$) included in the CGS group when the sequence identifier has a fourth value (e.g., 3).

In some aspects, the sequence identifier may be two bits, capable of having four different values. The sequence identifier may have a first value (e.g., zero) for a first set of DMRS port indexes, may have a second value (e.g., one) for a second set of DMRS port indexes, may have a third value (e.g., two) for a third set of DMRS port indexes, and may have a fourth value (e.g., three) for a fourth set of DMRS port indexes. In some aspects, the PUCCH may support four simultaneous DMRS transmissions (e.g., from four UEs 120 and/or four DMRS ports) on the same uplink resource. Thus, by using a sequence identifier with four possible values, four different (e.g., orthogonal or quasi-orthogonal) CGS base sequences may be generated for a corresponding four DMRS sequences to be transmitted in the same uplink resource. In this way, up to four UEs 120 may transmit orthogonal or quasi-orthogonal DMRS sequences in the same uplink resource (e.g., via a first, second, third, and fourth DMRS port).

In some aspects, the table may be populated with CGSs such that a first CGS base sequence, a second CGS base sequence, a third CGS base sequence, and a fourth CGS base sequence, included in the same CGS group (e.g., the same group of four CGSs), are orthogonal or quasi-orthogonal with one another. As described above, two sequences that are orthogonal to one another may have a cross-correlation of zero, and two sequences that are quasi-orthogonal to one another may have a cross-correlation that is less than or equal to a threshold (e.g., a first cross-correlation threshold $\gamma_1$). In some aspects, a CGS group may include four CGSs that are orthogonal to one another. Additionally, or alternatively, a CGS group may include four CGSs that are quasi-orthogonal to one another. In some aspects, each CGS group, included in the table, includes four CGSs that are orthogonal or quasi-orthogonal with one another. In this way, different UEs 120 assigned to transmit DMRS on the same set of resources may use orthogonal or quasi-orthogonal base sequences to generate a DMRS sequence for transmission.

Additionally, or alternatively, the table may be populated with CGSs such that a cross-correlation between any two CGSs, included in the table (e.g., included in any one of the CGS groups), is less than or equal to a threshold (e.g., a second cross-correlation threshold $\gamma_2$). In some aspects, the second cross-correlation threshold $\gamma_2$ may be greater than or equal to the first cross-correlation threshold $\gamma_1$. In this way, inter-cell interference may be reduced for UEs 120 that transmit different DMRS sequences in different cells.

Additionally, or alternatively, the table may be populated with CGSs such that each CGS included in the table (e.g., included in any one of the CGS groups) has a PAPR that is less than or equal to a PAPR threshold. In this way, the benefits of pi/2 BPSK modulation, which results in a low PAPR as described above, may be realized (e.g., may not be offset by using a DMRS sequence with a high PAPR).

In some aspects, the table may be populated with CGSs (e.g., CGS base sequences) such that every pair of cyclic-shifted sequences, capable of being generated from the CGS base sequences, are orthogonal or quasi-orthogonal with one another (e.g., have cross-correlations that are less than or equal to one or more of the thresholds described above). Additionally, or alternatively, the table may be populated with CGSs (e.g., CGS base sequences) such that every cyclic-shift sequence, capable of being generated from the CGS base sequences, has a PAPR that is less than or equal to the PAPR threshold described above. In this way, the base sequences and the DMRS sequences that are generated from the base sequences may be distinguishable and/or may assist with realizing the benefits of pi/2 BPSK modulation, as described above.

With reference again to reference number 740, and as noted above, the CGS may be selected from a table that is stored by the UE 120. Additionally or alternatively to the various aspects of the table described above, the table may not include a group of four sequences per "group" index. Rather, a "group" as described above may comprise a single sequence, such that the table comprises, for example, a first CGS (e.g., $s_0$), represented by CGS index (u) 0, a second CGS (e.g., $s_1$), represented by CGS index 1, and so on (e.g., through a thirtieth CGS, represented by a CGS index of 29). In some aspects, a UE 120 may select a CGS, to be used as a base sequence, based at least in part on the CGS index (instead of a CGS group index). The CGS index may be determined by the UE 120 using the orthogonal code index assigned to the UE 120, as described below. Hence, similar to the example discussed further above where the orthogonal code index is used to determine a CGS, in this example, the orthogonal code index can be used to determine the CGS index where a single sequence is associated with each CGS index in the table. While in the example discussed further above, the CGS group index was determined without reference to an orthogonal code index, but the orthogonal code index was then used to determine the sequences of the group of sequences (e.g., group of four) associated with the CGS group index.

For example, the orthogonal code index described further above for use in determining which sequence of the group of sequences in the CGS group to select may be used to determine the CGS index. The UE 120 may use the orthogonal code index signaled to the UE in order to identify the sequence to be used in the table of CGSs. The CGS index, u, can be determined based on orthogonal code index, $\Delta$, in accordance with any of the following three equations:

$$u=(f_{gh}+(1+\Delta)f_{ss}) \bmod 30$$

$$u=((1+\Delta)f_{gh}+f_{ss}) \bmod 30$$

$$u=(f_{gh}+f_{ss}+\Delta \cdot 2^A) \bmod 30$$

where A is an integer $\{0, 1, 2, \ldots\}$
and where $f_{gh}$ can be defined as any of the following three equations $$f_{gh} = \left(\sum_{m=0}^{7} 2^m c(8 n_{s,f}^{\mu} + n_{hop}) + m)\right) \bmod 30$$

$$f_{gh} = \left(\sum_{m=0}^{7} 2^m c(8 n_{s,f}^{\mu} + n_{hop} + \Delta \cdot 2^A) + m)\right) \bmod 30$$

$$f_{gh} = \left(\sum_{m=0}^{7} 2^m c(8 n_{s,f}^{\mu} + n_{hop}) + m + \Delta \cdot 2^A)\right) \bmod 30$$

In the above equations, $f_{ss}=n_{ID} \bmod 30$ and $n_{hop}$ can represent a frequency hop index, while other the variables may represent values as described above in connection with FIG. 5 and elsewhere in FIG. 6. The frequency hop index is used since, for PUCCH, DMRS sequence is hopped on a per frequency hop basis. It is understood that this is in contrast with DMRS transmission over PUSCH because in PUSCH, the DMRS sequence is hopped on a per OFDM symbol basis.

Once DMRS sequences are generated using a CGS as described in various aspects above, as shown by reference number 780, the first UE 120 (e.g., UE A) may generate a first DMRS sequence (e.g., DMRS sequence A), and may transmit the first DMRS sequence on an uplink resource (e.g., a time resource, a frequency resource, a spatial resource, and/or the like). Similarly, as shown by reference number 790, the second UE 120 (e.g., UE B) may generate a second DMRS sequence (e.g., DMRS sequence B), and may transmit the second DMRS sequence on the same uplink resource. For example, the first DMRS sequence and the second DMRS sequence may be transmitted in the same symbol and the same set of resource blocks (e.g., on all sub-carriers, since the PUCCH may not use a frequency domain comb structure). Although not shown, the techniques described above may support up to two additional UEs 120 (e.g., a third UE 120 and a fourth UE 120) that transmit DMRS sequences on the PUCCH in the same time and/or frequency resources as the first UE 120 and the second UE 120.

Using some of the techniques described above, the first DMRS sequence and the second DMRS sequence (and a third DMRS sequence and a fourth DMRS sequence, if transmitted) may be orthogonal or quasi-orthogonal to one another. Thus, a base station 110 may be capable of distinguishing the DMRS sequences (e.g., for different DMRS ports and/or different UEs 120) despite those DMRS sequences being transmitted in the same time and/or frequency resources. With reference to aspects described above relating to a table of CGSs where each CGS index is associated with a single sequence, it is understood that the first DMRS sequence and the second DMRS sequence may not be orthogonal and/or may not be quasi-orthogonal to each other.

As indicated above, FIG. 7 is provided as an example. Other examples may differ from what is described with respect to FIG. 7.

Figure 8:
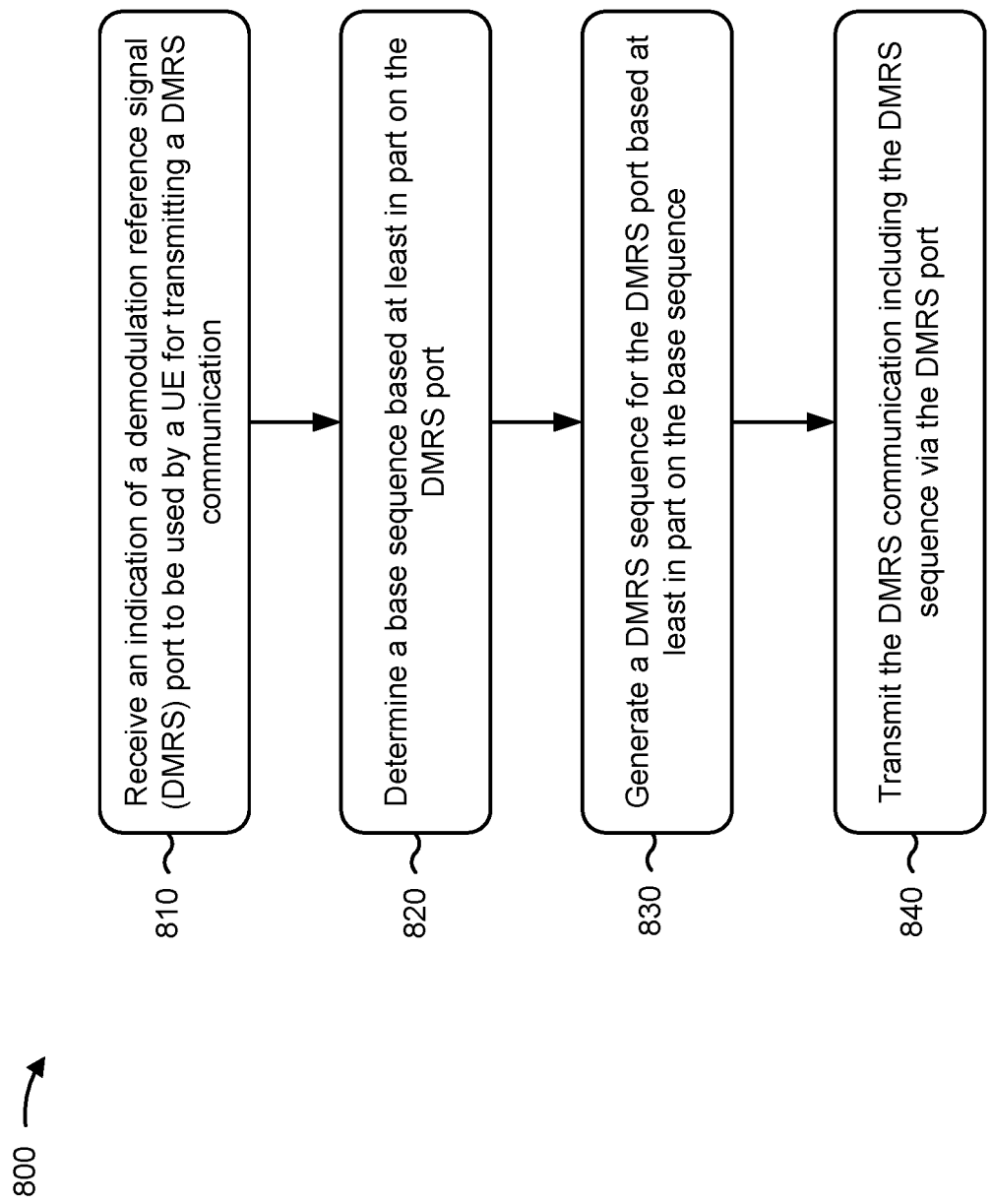
FIGS. 8-11 are diagrams illustrating example processes relating to sequence generation to support DMRS multiplexing for pi over 2 BPSK modulation, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with sequence generation to support DMRS multiplexing for pi over 2 BPSK modulation.

As shown in FIG. 8, in some aspects, process 800 may include receiving an indication of a demodulation reference signal (DMRS) port to be used by the UE for transmitting a DMRS communication (block 810). For example, the UE (e.g., using antenna 252, DEMOD 254, MIMO detector 256, receive processor 258, controller/processor 280, and/or the like) may receive an indication of a DMRS port to be used by the UE for transmitting a DMRS communication, as described above, for example, with reference to FIGS. 4, 5, 6, and/or 7.

As further shown in FIG. 8, in some aspects, process 800 may include determining a base sequence based at least in part on the DMRS port (block 820). For example, the UE (e.g., using controller/processor 280 and/or the like) may determine a base sequence based at least in part on the DMRS port, as described above, for example, with reference to FIGS. 4, 5, 6, and/or 7.

As further shown in FIG. 8, in some aspects, process 800 may include generating a DMRS sequence for the DMRS port based at least in part on the base sequence (block 830). For example, the UE (e.g., using controller/processor 280 and/or the like) may generate a DMRS sequence for the DMRS port based at least in part on the base sequence, as described above, for example, with reference to FIGS. 4, 5, 6, and/or 7.

As further shown in FIG. 8, in some aspects, process 800 may include transmitting the DMRS communication including the DMRS sequence via the DMRS port (block 840). For example, the UE (e.g., using controller/processor 280, transmit processor 264, TX MIMO processor 266, MOD 254, antenna 252, and/or the like) may transmit the DMRS sequence, including the DMRS sequence, via the DMRS port, as described above, for example, with reference to FIGS. 4, 5, 6, and/or 7.

Process 800 may include additional aspects, such as any single aspect or any combination of aspects described below and/or in connection with one or more other processes described elsewhere herein.

In a first aspect, the DMRS communication is transmitted in a same symbol and a same set of sub-carriers as another DMRS communication transmitted by another UE in a same cell as the UE.

In a second aspect, alone or in combination with the first aspect, the DMRS communication is transmitted in a same symbol and a same set of resource blocks, but on a different set of sub-carriers, as another DMRS communication transmitted by another UE in a same cell as the UE.

In a third aspect, alone or in combination with one or more of the first and second aspects, the DMRS communication is transmitted in an uplink transmission that is modulated using pi over two binary phase shift keying modulation.

In a fourth aspect, alone or in combination with one or more of the first through third aspects, the base sequence is a Gold sequence generated using a seed that is determined based at least in part on the DMRS port.

In a fifth aspect, alone or in combination with one or more of the first through fourth aspects, the Gold sequence is determined based at least in part on at least one of: a determination that a DMRS length is greater than or equal to a threshold, a determination that the DMRS communication is to be transmitted on a physical uplink shared channel (PUSCH), or, a combination thereof.

In a sixth aspect, alone or in combination with one or more of the first through fifth aspects, the seed is generated based at least in part on performing a modulo two operation on a DMRS port index of the DMRS port.

In a seventh aspect, alone or in combination with one or more of the first through sixth aspects, the base sequence is a computer-generated sequence selected from a table, stored by the UE, based at least in part on a group index, determined by the UE, and the DMRS port.

In an eighth aspect, alone or in combination with one or more of the first through seventh aspects, the computer-generated sequence is selected from the table based at least in part on: determining a pair of computer-generated sequences that correspond to the group index, and selecting the computer-generated sequence from the pair of computer-generated sequences based at least in part on performing a modulo two operation on a DMRS port index of the DMRS port.

In a ninth aspect, alone or in combination with one or more of the first through eighth aspects, the computer-generated sequence is selected based at least in part on at least one of: a determination that a DMRS length is less than or equal to a threshold, a determination that the DMRS communication is for a physical uplink shared channel (PUSCH), or a combination thereof.

In a tenth aspect, alone or in combination with one or more of the first through ninth aspects, the table is selected from a plurality of tables based at least in part on a DMRS length.

In an eleventh aspect, alone or in combination with one or more of the first through tenth aspects, the group index corresponds to a computer-generated sequence group.

In a twelfth aspect, alone or in combination with one or more of the first through eleventh aspects, the computer-generated sequence is included in the computer-generated sequence group.

In a thirteenth aspect, alone or in combination with one or more of the first through twelfth aspects, the table indicates relationships between a plurality of group indexes and a corresponding plurality of computer-generated sequence groups.

In a fourteenth aspect, alone or in combination with one or more of the first through thirteenth aspects, each of the plurality of computer-generated sequences groups includes two computer-generated sequences.

In a fifteenth aspect, alone or in combination with one or more of the first through fourteenth aspects, each computer-generated sequence group, included in the plurality of computer-generated sequence groups, includes two computer-generated sequences that are orthogonal or quasi-orthogonal with one another.

In a sixteenth aspect, alone or in combination with one or more of the first through fifteenth aspects, a cross-correlation between every two computer-generated sequences, included in the plurality of computer-generated sequence groups, is less than or equal to a threshold.

In a seventeenth aspect, alone or in combination with one or more of the first through sixteenth aspects, each computer-generated sequence, in the plurality of computer-generated sequence groups, has a peak-to-average power ratio (PAPR) that is less than or equal to a PAPR threshold.

In an eighteenth aspect, alone or in combination with one or more of the first through seventeenth aspects, the base sequence is a computer-generated sequence selected from a table, stored by the UE, based at least in part on a group index, determined by the UE, and an orthogonal code index signaled to the UE.

In a nineteenth aspect, alone or in combination with one or more of the first through eighteenth aspects, the computer-generated sequence is selected from the table based at least in part on determining a computer-generated sequence group that corresponds to the group index, and selecting the computer-generated sequence from the computer-generated sequence group based at least in part on the orthogonal code index.

In a twentieth aspect, alone or in combination with one or more of the first through nineteenth aspects, the computer-generated sequence is selected based at least in part on a determination that the DMRS communication is for a physical uplink control channel (PUCCH).

In a twenty-first aspect, alone or in combination with one or more of the first through twentieth aspects, the PUCCH is PUCCH format 3 or PUCCH format 4.

In a twenty-second aspect, alone or in combination with one or more of the first through twenty-first aspects, the group index corresponds to a computer-generated sequence group.

In a twenty-third aspect, alone or in combination with one or more of the first through twenty-second aspects, the computer-generated sequence is included in the computer-generated sequence group.

In a twenty-fourth aspect, alone or in combination with one or more of the first through twenty-third aspects, the table indicates relationships between a plurality of group indexes and a corresponding plurality of computer-generated sequence groups.

In a twenty-fifth aspect, alone or in combination with one or more of the first through twenty-fourth aspects, each of the plurality of computer-generated sequence groups includes four computer-generated sequences.

In a twenty-sixth aspect, alone or in combination with one or more of the first through twenty-fifth aspects, each computer-generated sequence group, included in the plurality of computer-generated sequence groups, includes four computer-generated sequences that are orthogonal or quasi-orthogonal with one another.

In a twenty-seventh aspect, alone or in combination with one or more of the first through twenty-sixth aspects, a cross-correlation between every two computer-generated sequences, included in the plurality of computer-generated sequence groups, is less than or equal to a threshold.

In a twenty-eighth aspect, alone or in combination with one or more of the first through twenty-seventh aspects, each computer-generated sequence, in the plurality of computer-generated sequence groups, has a peak-to-average power ratio (PAPR) that is less than or equal to a PAPR threshold.

In a twenty-ninth aspect, alone or in combination with one or more of the first through twenty-eighth aspects, the base sequence is a computer-generated sequence selected from a table, of a plurality of tables, identified based at least in part on whether the DMRS communication is for a physical uplink shared channel (PUSCH) or a physical uplink control channel (PUCCH).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
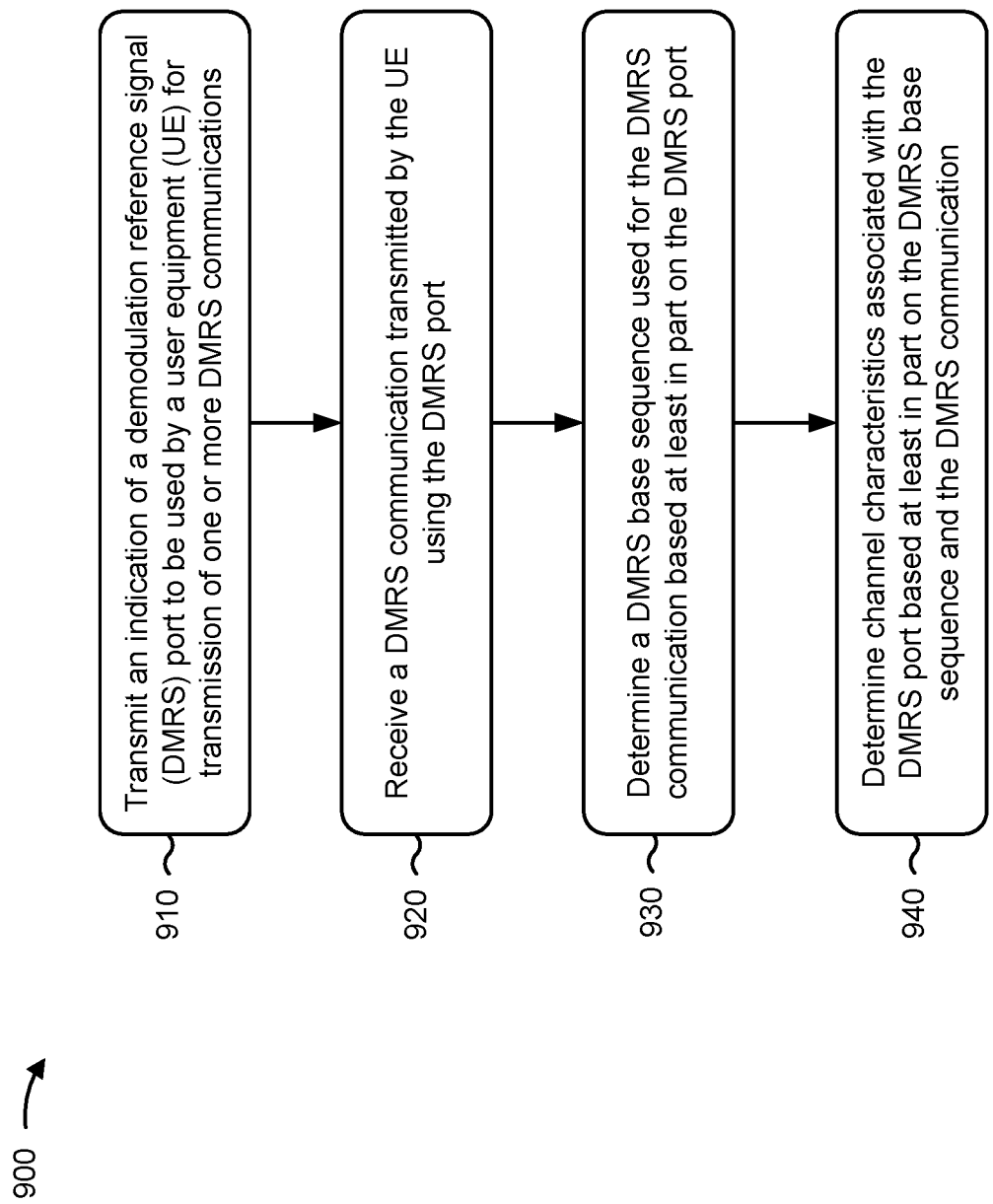

FIG. 9 is a diagram illustrating an example process 900 performed, for example, by a base station, in accordance with various aspects of the present disclosure. Example process 900 is an example where a base station (e.g., base station 110 and/or the like) performs operations associated with sequence generation to support DMRS multiplexing for pi over 2 BPSK modulation.

As shown in FIG. 9, in some aspects, process 900 may include transmitting an indication of a demodulation reference signal (DMRS) port to be used by a user equipment (UE) for transmission of one or more DMRS communications (block 910). For example, the base station (e.g., using controller/processor 240, transmit processor 220, TX MIMO processor 230, MOD 232, antenna 234, and/or the like) may transmit an indication of a DMRS port to be used by a UE for transmission of one or more DMRS communications, as described above, for example, with reference to FIGS. 4, 5, 6, and/or 7.

As further shown in FIG. 9, in some aspects, process 900 may include receiving, at the base station, a DMRS communication transmitted by the UE using the DMRS port (block 920). For example, the base station (e.g., using antenna 234, DEMOD 232, MIMO detector 236, receive processor 238, controller/processor 240, and/or the like) may receive a DMRS communication transmitted by the UE using the DMRS port, as described above, for example, with reference to FIGS. 4, 5, 6, and/or 7.

As further shown in FIG. 9, in some aspects, process 900 may include determining a DMRS base sequence used for the DMRS communication based at least in part on the DMRS port (block 930). For example, the base station (e.g., using controller/processor 240 and/or the like) may determine a DMRS base sequence used for the DMRS communication based at least in part on the DMRS port used by the UE, as described above, for example, with reference to FIGS. 4, 5, 6, and/or 7.

As further shown in FIG. 9, in some aspects, process 900 may include determining channel characteristics associated with the DMRS port based at least in part on the DMRS base sequence and the DMRS communication (block 940). For example, the base station (e.g., using controller/processor 240 and/or the like) may determine channel characteristics associated with the DMRS port based at least in part on the DMRS base sequence and the DMRS communication, as described above, for example, with reference to FIGS. 4, 5, 6, and/or 7.

Process 900 may include additional aspects, such as any single aspect or any combination of aspects described below and/or in connection with one or more other processes described elsewhere herein.

In a first aspect, the DMRS communication is received in a same symbol and a same set of sub-carriers as another DMRS communication received from another UE in a same cell as the UE.

In a second aspect, alone or in combination with the first aspect, the DMRS communication is received in a same symbol and a same set of resource blocks, but on a different set of sub-carriers, as another DMRS communication received from another UE in a same cell as the UE.

In a third aspect, alone or in combination with one or more of the first and second aspects, the DMRS communication is received in an uplink communication that is modulated using pi over two binary phase shift keying modulation.

In a fourth aspect, alone or in combination with one or more of the first through third aspects, the DMRS base sequence is a Gold sequence determined using a seed that is determined based at least in part on the DMRS port.

In a fifth aspect, alone or in combination with one or more of the first through fourth aspects, the Gold sequence is determined based at least in part on at least one of: a determination that a DMRS length is greater than or equal to a threshold, a determination that the DMRS communication is received on a physical uplink shared channel (PUSCH), or a combination thereof.

In a sixth aspect, alone or in combination with one or more of the first through fifth aspects, the seed is generated based at least in part on performing a modulo two operation on a DMRS port index of the DMRS port.

In a seventh aspect, alone or in combination with one or more of the first through sixth aspects, the DMRS base sequence is a computer-generated sequence selected from a table, stored by the base station, based at least in part on a group index, determined by the base station, and the DMRS port.

In an eighth aspect, alone or in combination with one or more of the first through seventh aspects, the computer-generated sequence is selected from the table based at least in part on determining a pair of computer-generated sequences that correspond to the group index, and selecting the computer-generated sequence from the pair of computer-generated sequences based at least in part on performing a modulo two operation on a DMRS port index of the DMRS port.

In a ninth aspect, alone or in combination with one or more of the first through eighth aspects, the computer-generated sequence is selected based at least in part on at least one of: a determination that a DMRS length is less than or equal to a threshold, a determination that the DMRS communication is received on a physical uplink shared channel (PUSCH), or a combination thereof.

In a tenth aspect, alone or in combination with one or more of the first through ninth aspects, the table is selected from a plurality of tables based at least in part on a DMRS length.

In an eleventh aspect, alone or in combination with one or more of the first through tenth aspects, the group index corresponds to a computer-generated sequence group.

In a twelfth aspect, alone or in combination with one or more of the first through eleventh aspects, the computer-generated sequence is included in the computer-generated sequence group.

In a thirteenth aspect, alone or in combination with one or more of the first through twelfth aspects, the table indicates relationships between a plurality of group indexes and a corresponding plurality of computer-generated sequence groups.

In a fourteenth aspect, alone or in combination with one or more of the first through thirteenth aspects, each of the plurality of computer-generated sequences groups includes two computer-generated sequences.

In a fifteenth aspect, alone or in combination with one or more of the first through fourteenth aspects, each computer-generated sequence group, included in the plurality of computer-generated sequence groups, includes two computer-generated sequences that are orthogonal or quasi-orthogonal with one another.

In a sixteenth aspect, alone or in combination with one or more of the first through fifteenth aspects, a cross-correlation between every two computer-generated sequences, included in the plurality of computer-generated sequence groups, is less than or equal to a threshold.

In a seventeenth aspect, alone or in combination with one or more of the first through sixteenth aspects, each computer-generated sequence, in the plurality of computer-generated sequence groups, has a peak-to-average power ratio (PAPR) that is less than or equal to a PAPR threshold.

In an eighteenth aspect, alone or in combination with one or more of the first through seventeenth aspects, the DMRS base sequence is a computer-generated sequence selected from a table, stored by the base station, based at least in part on a group index, determined by the base station, and an orthogonal code index signaled to the UE.

In a nineteenth aspect, alone or in combination with one or more of the first through eighteenth aspects, the computer-generated sequence is selected from the table based at least in part on determining a computer-generated sequence group that corresponds to the group index, and selecting the computer-generated sequence from the computer-generated sequence group based at least in part on the orthogonal code index.

In a twentieth aspect, alone or in combination with one or more of the first through nineteenth aspects, the computer-generated sequence is selected based at least in part on a determination that the DMRS communication is received on a physical uplink control channel (PUCCH).

In a twenty-first aspect, alone or in combination with one or more of the first through twentieth aspects, the PUCCH is PUCCH format 3 or PUCCH format 4.

In a twenty-second aspect, alone or in combination with one or more of the first through twenty-first aspects, the group index corresponds to a computer-generated sequence group.

In a twenty-third aspect, alone or in combination with one or more of the first through twenty-second aspects, the computer-generated sequence is included in the computer-generated sequence group.

In a twenty-fourth aspect, alone or in combination with one or more of the first through twenty-third aspects, the table indicates relationships between a plurality of group indexes and a corresponding plurality of computer-generated sequence groups.

In a twenty-fifth aspect, alone or in combination with one or more of the first through twenty-fourth aspects, each of the plurality of computer-generated sequence groups includes four computer-generated sequences.

In a twenty-sixth aspect, alone or in combination with one or more of the first through twenty-fifth aspects, each computer-generated sequence group, included in the plurality of computer-generated sequence groups, includes four computer-generated sequences that are orthogonal or quasi-orthogonal with one another.

In a twenty-seventh aspect, alone or in combination with one or more of the first through twenty-sixth aspects, a cross-correlation between every two computer-generated sequences, included in the plurality of computer-generated sequence groups, is less than or equal to a threshold.

In a twenty-eighth aspect, alone or in combination with one or more of the first through twenty-seventh aspects, each computer-generated sequence, in the plurality of computer-generated sequence groups, has a peak-to-average power ratio (PAPR) that is less than or equal to a PAPR threshold.

In a twenty-ninth aspect, alone or in combination with one or more of the first through twenty-eighth aspects, the base sequence is a computer-generated sequence selected from a table, of a plurality of tables, identified based at least in part on whether the DMRS communication is for a physical uplink shared channel (PUSCH) or a physical uplink control channel (PUCCH).

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
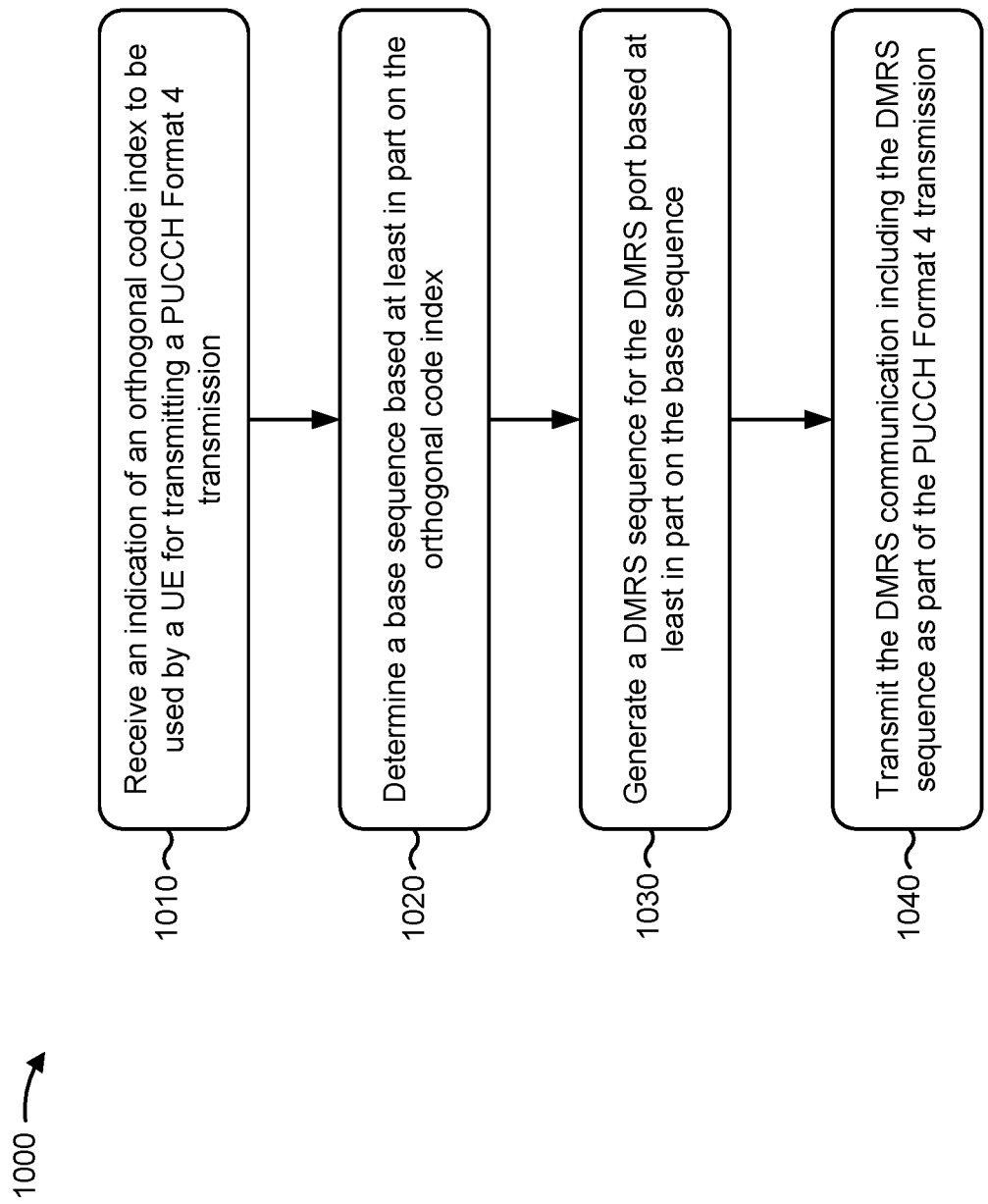

FIG. 10 is a diagram illustrating an example process 1000 performed, for example, by a UE, in accordance with various aspects of the present disclosure. Example process 1000 is an example where the UE (e.g., UE 120 and/or the like) performs operations associated with sequence generation to support DMRS multiplexing for pi over 2 BPSK modulation.

As shown in FIG. 10, in some aspects, process 1000 may include receiving an indication of an orthogonal code index to be used by the UE for transmitting a physical uplink control channel (PUCCH) Format 4 transmission (block 1010). For example, the UE (e.g., using receive processor 258, controller/processor 280, memory 282, and/or the like) may receive an indication of an orthogonal code index to be used by the UE for transmitting a PUCCH Format 4 transmission, as described above, for example, with reference to FIGS. 4, 5, 6, and/or 7.

As further shown in FIG. 10, in some aspects, process 1000 may include determining a base sequence based at least in part on the orthogonal code index (block 1020). For example, the UE (e.g., using receive processor 258, transmit processor 264, controller/processor 280, memory 282, and/or the like) may determine a base sequence based at least in part on the orthogonal code index, as described above, for example, with reference to FIGS. 4, 5, 6, and/or 7.

As further shown in FIG. 10, in some aspects, process 1000 may include generating a DMRS sequence based at least in part on the base sequence (block 1030). For example, the UE (e.g., using receive processor 258, transmit processor 264, controller/processor 280, memory 282, and/or the like) may generate a DMRS sequence based at least in part on the base sequence, as described above, for example, with reference to FIGS. 4, 5, 6, and/or 7.

As further shown in FIG. 10, in some aspects, process 1000 may include transmitting the DMRS communication including the DMRS sequence as part of the PUCCH Format 4 transmission (block 1040). For example, the UE (e.g., using transmit processor 264, controller/processor 280, memory 282, and/or the like) may transmit the DMRS communication including the DMRS sequence as part of the PUCCH Format 4 transmission, as described above, for example, with reference to FIGS. 4, 5, 6, and/or 7.

Process 1000 may include additional aspects, such as any single aspect or any combination of aspects described below and/or in connection with one or more other processes described elsewhere herein.

In a first aspect, determining the base sequence based at least in part on the orthogonal code index comprises: determining an index based at least in part on the orthogonal code index; and selecting a computer-generated sequence from a table, stored by the UE, using the index.

In a second aspect, alone or in combination with the first aspect, the base sequence is a computer-generated sequence selected based at least in part on a determination that the DMRS communication is for the PUCCH.

In a third aspect, alone or in combination with one or more of the first and second aspects, the base sequence is a computer-generated sequence selected from a table, of a plurality of tables, identified based at least in part on whether the DMRS communication is for a PUSCH or a PUCCH.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
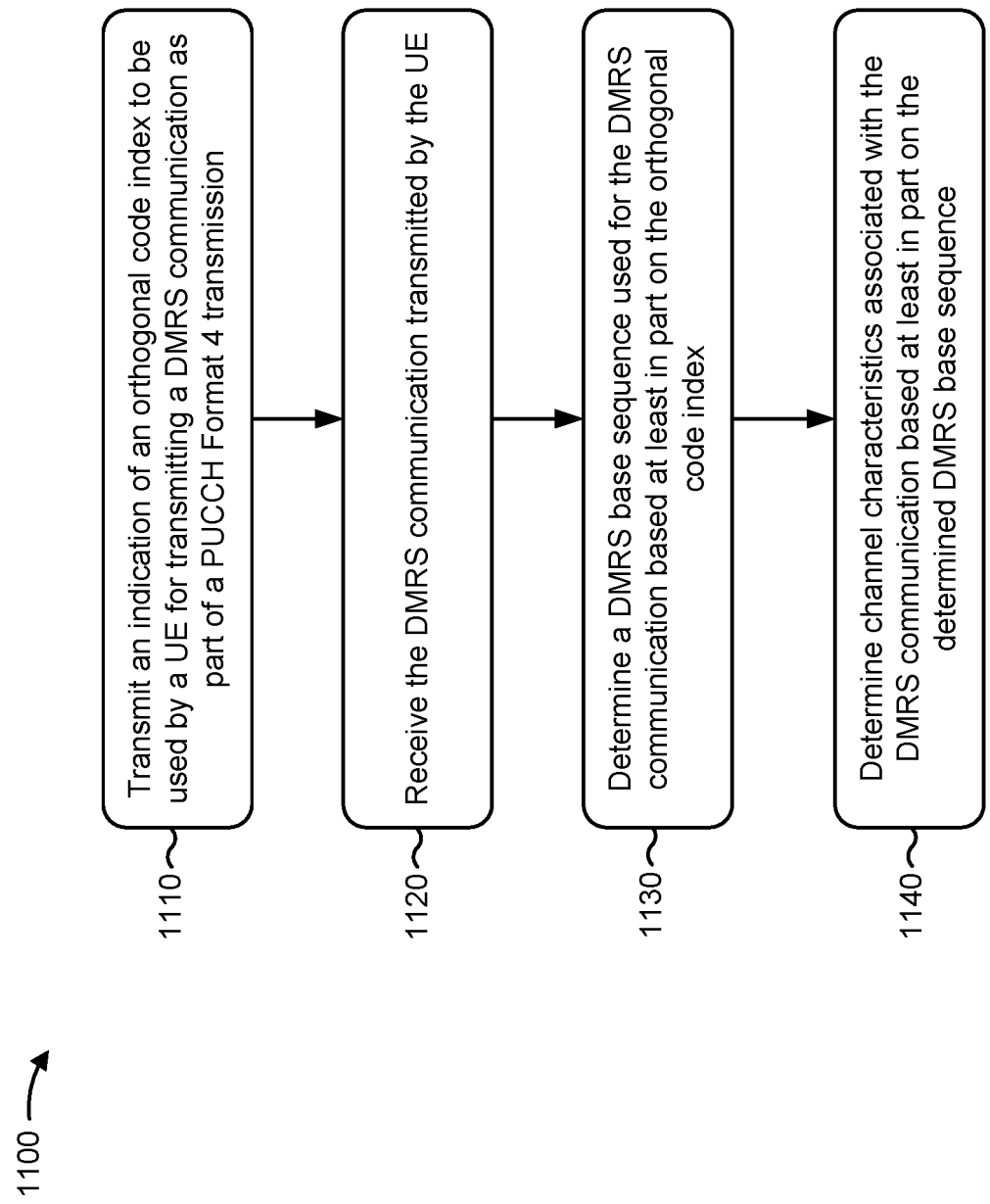

FIG. 11 is a diagram illustrating an example process 1100 performed, for example, by a base station, in accordance with various aspects of the present disclosure. Example process 1100 is an example where the base station (e.g., base station 110 and/or the like) performs operations associated with sequence generation to support DMRS multiplexing for pi over 2 BPSK modulation.

As shown in FIG. 11, in some aspects, process 1100 may include transmitting an indication of an orthogonal code index to be used by a UE for transmitting a DMRS communication as part of a PUCCH Format 4 transmission (block 1110). For example, the base station (e.g., using transmit processor 220, controller/processor 240, memory 242, and/or the like) may transmit an indication of an orthogonal code index to be used by a UE for transmitting a DMRS communication as part of a PUCCH Format 4 transmission, as described above, for example, with reference to FIGS. 4, 5, 6, and/or 7.

As further shown in FIG. 11, in some aspects, process 1100 may include receiving the DMRS communication transmitted by the UE (block 1120). For example, the base station (e.g., using receive processor 238, controller/processor 240, memory 242, and/or the like) may receive the DMRS communication transmitted by the UE, as described above, for example, with reference to FIGS. 4, 5, 6, and/or 7.

As further shown in FIG. 11, in some aspects, process 1100 may include determining a DMRS base sequence used for the DMRS communication based at least in part on the orthogonal code index (block 1130). For example, the base station (e.g., using transmit processor 220, receive processor 238, controller/processor 240, memory 242, and/or the like) may determine a DMRS base sequence used for the DMRS communication based at least in part on the orthogonal code index, as described above, for example, with reference to FIGS. 4, 5, 6, and/or 7.

As further shown in FIG. 11, in some aspects, process 1100 may include determining channel characteristics associated with the DMRS communication based at least in part on the determined DMRS base sequence (block 1140). For example, the base station (e.g., using transmit processor 220, receive processor 238, controller/processor 240, memory 242, and/or the like) may determine channel characteristics associated with the DMRS communication based at least in part on the determined DMRS base sequence, as described above, for example, with reference to FIGS. 4, 5, 6, and/or 7.

Process 1100 may include additional aspects, such as any single aspect or any combination of aspects described below and/or in connection with one or more other processes described elsewhere herein.

In a first aspect, determining the DMRS base sequence used for the DMRS communication based at least in part on the orthogonal code index comprises: determining an index based at least in part on the orthogonal code index; and selecting a computer-generated sequence from a table, stored by the base station, using the index.

In a second aspect, alone or in combination with the first aspect, the base sequence is a computer-generated sequence selected based at least in part on a determination that the DMRS communication is for the PUCCH.

In a third aspect, alone or in combination with one or more of the first and second aspects, the base sequence is a computer-generated sequence selected from a table, of a plurality of tables, identified based at least in part on whether the DMRS communication is for a PUSCH or a PUCCH.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of a demodulation reference signal (DMRS) port to be used by the UE for transmitting a DMRS communication, the indication enabling the UE to determine a base sequence for transmitting the DMRS communication if pi over two binary phase shift keying (BPSK) modulation is used;
   determining the base sequence based at least in part on performing a modulo two operation on a DMRS port index of the DMRS port;
   generating a DMRS sequence for the DMRS port based at least in part on the base sequence; and
   transmitting the DMRS communication including the DMRS sequence via the DMRS port in an uplink transmission that is modulated using the pi over two BPSK modulation.

2. The method of claim 1, wherein the DMRS communication is transmitted in a same symbol and a same set of sub-carriers as another DMRS communication transmitted by another UE in a same cell as the UE.

3. The method of claim 1, wherein the DMRS communication is transmitted in a same symbol and a same set of resource blocks, but on a different set of sub-carriers, as another DMRS communication transmitted by another UE in a same cell as the UE.

4. The method of claim 1, wherein the base sequence is a pi over two BPSK modulated Gold sequence generated using a seed that is determined based at least in part on the DMRS port.

5. The method of claim 4, wherein the pi over two BPSK modulated Gold sequence is determined based at least in part on at least one of:
   a determination that a DMRS length is greater than or equal to a threshold,
   a determination that the DMRS communication is to be transmitted on a physical uplink shared channel (PUSCH), or
   a combination thereof.

6. The method of claim 1, further comprising:
   receiving two scrambling identifiers from a base station; and
   determining a scrambling identifier of the two scrambling identifiers, used to generate the base sequence, based at least in part on performing the modulo two operation on the DMRS port index of the DMRS port.

7. The method of claim 1, wherein the base sequence is a computer-generated sequence selected from a table, stored by the UE, based at least in part on performing the modulo two operation on the DMRS port index of the DMRS port.

8. The method of claim 7, wherein the computer-generated sequence is selected from the table based on an index, wherein the index is determined based at least in part on performing the modulo two operation on the DMRS port index of the DMRS port.

9. The method of claim 7, wherein the computer-generated sequence is selected from the table based at least in part on:
   determining a pair of computer-generated sequences that correspond to an index; and
   selecting the computer-generated sequence from the pair of computer-generated sequences based at least in part on performing the modulo two operation on the DMRS port index of the DMRS port.

10. The method of claim 7, wherein the computer-generated sequence is selected based at least in part on at least one of:
a determination that a DMRS length is less than or equal to a threshold,
a determination that the DMRS communication is for a physical uplink shared channel (PUSCH), or
a combination thereof.

11. The method of claim 1, wherein the base sequence is a computer-generated sequence selected from a table, stored by the UE, based at least in part on a group index, determined by the UE, and an orthogonal code index signaled to the UE.

12. A method of wireless communication performed by a base station, comprising:
transmitting an indication of a demodulation reference signal (DMRS) port to be used by a user equipment (UE) for transmission of one or more DMRS communications, the indication enabling the UE to determine a DMRS base sequence for transmitting the DMRS communication if pi over two binary phase shift keying (BPSK) modulation is used;
receiving a DMRS communication transmitted by the UE using the DMRS port in an uplink transmission that is modulated using the pi over two BPSK modulation;
determining the DMRS base sequence used for the DMRS communication based at least in part on performing a modulo two operation on a DMRS port index of the DMRS port; and
determining channel characteristics associated with the DMRS port based at least in part on the DMRS base sequence and the DMRS communication.

13. The method of claim 12, wherein the DMRS communication is received in a same symbol and a same set of sub-carriers as another DMRS communication received from another UE in a same cell as the UE.

14. The method of claim 12, wherein the DMRS communication is received in a same symbol and a same set of resource blocks, but on a different set of sub-carriers, as another DMRS communication received from another UE in a same cell as the UE.

15. The method of claim 12, wherein the DMRS base sequence is a pi over two BPSK modulated Gold sequence determined using a seed that is determined based at least in part on the DMRS port.

16. The method of claim 15, wherein the pi over two BPSK modulated Gold sequence is determined based at least in part on at least one of:
a determination that a DMRS length is greater than or equal to a threshold,
a determination that the DMRS communication is received on a physical uplink shared channel (PUSCH), or
a combination thereof.

17. The method of claim 15, further comprising:
transmitting two scrambling identifiers to the UE; and
determining a scrambling identifier of the two scrambling identifiers, used to generate the base sequence, based at least in part on performing the modulo two operation on the DMRS port index of the DMRS port.

18. The method of claim 12, wherein the DMRS base sequence is a computer-generated sequence selected from a table, stored by the base station, based at least in part on performing the modulo two operation on the DMRS port index of the DMRS port.

19. The method of claim 18, wherein the computer-generated sequence is selected from the table based on an index,
wherein the index is determined based at least in part on performing the modulo two operation on the DMRS port index of the DMRS port.

20. The method of claim 18, wherein the computer-generated sequence is selected from the table based at least in part on:
determining a pair of computer-generated sequences that correspond to an index; and
selecting the computer-generated sequence from the pair of computer-generated sequences based at least in part on performing the modulo two operation on the DMRS port index of the DMRS port.

21. The method of claim 18, wherein the computer-generated sequence is selected based at least in part on at least one of:
a determination that a DMRS length is less than or equal to a threshold,
a determination that the DMRS communication is received on a physical uplink shared channel (PUSCH), or
a combination thereof.

22. The method of claim 12, wherein the DMRS base sequence is a computer-generated sequence selected from a table, stored by the base station, based at least in part on a group index, determined by the base station, and an orthogonal code index signaled to the UE.

23. A user equipment (UE) for wireless communication, comprising:
a memory; and
one or more processors operatively coupled to the memory, the memory and the one or more processors configured to:
receive an indication of a demodulation reference signal (DMRS) port to be used by the UE for transmitting a DMRS communication, the indication enabling the UE to determine a base sequence for transmitting the DMRS communication if pi over two binary phase shift keying (BPSK) modulation is used;
determine the base sequence based at least in part on performing a modulo two operation on a DMRS port index of the DMRS port;
generate a DMRS sequence for the DMRS port based at least in part on the base sequence; and
transmit the DMRS communication including the DMRS sequence via the DMRS port in an uplink transmission that is modulated using the pi over two BPSK modulation.

24. The UE of claim 23, wherein the DMRS communication is transmitted in a same symbol and a same set of sub-carriers as another DMRS communication transmitted by another UE in a same cell as the UE.

25. The UE of claim 23, wherein the DMRS communication is transmitted in a same symbol and a same set of resource blocks, but on a different set of sub-carriers, as another DMRS communication transmitted by another UE in a same cell as the UE.

26. The UE of claim 23, wherein the base sequence is a pi over two BPSK modulated Gold sequence generated using a seed that is determined based at least in part on the DMRS port.

27. A base station for wireless communication, comprising:
a memory; and one or more processors operatively coupled to the memory, the memory and the one or more processors configured to:

transmit an indication of a demodulation reference signal (DMRS) port to be used by a user equipment (UE) for transmission of one or more DMRS communications, the indication enabling the UE to determine a DMRS base sequence for transmitting the DMRS communication if pi over two binary phase shift keying (BPSK) modulation is used;

receive a DMRS communication transmitted by the UE using the DMRS port in an uplink transmission that is modulated using the pi over two BPSK modulation;

determine the DMRS base sequence used for the DMRS communication based at least in part on performing a modulo two operation on a DMRS port index of the DMRS port; and determine channel characteristics associated with the DMRS port based at least in part on the DMRS base sequence and the DMRS communication.

28. The base station of claim 27, wherein the DMRS communication is received in a same symbol and a same set of sub-carriers as another DMRS communication received from another UE in a same cell as the UE.

29. The base station of claim 27, wherein the DMRS communication is received in a same symbol and a same set of resource blocks, but on a different set of sub-carriers, as another DMRS communication received from another UE in a same cell as the UE.

30. The base station of claim 27, wherein the DMRS base sequence is a pi over two BPSK modulated Gold sequence determined using a seed that is determined based at least in part on the DMRS port.

* * * * *